(12) United States Patent
Natsume et al.

(10) Patent No.: US 7,692,630 B2
(45) Date of Patent: Apr. 6, 2010

(54) INFORMATION PROCESSING APPARATUS AND METHOD, INPUT DEVICE AND METHOD, PROGRAM, AND INFORMATION PROCESSING SYSTEM

(75) Inventors: Tetsu Natsume, Chiba (JP); Yuji Ayatsuka, Tokyo (JP); Junichi Rekimoto, Tokyo (JP)

(73) Assignee: Sony Corporation, Tokyo (JP)

( * ) Notice: Subject to any disclaimer, the term of this patent is extended or adjusted under 35 U.S.C. 154(b) by 1153 days.

(21) Appl. No.: 11/296,226

(22) Filed: Dec. 8, 2005

(65) Prior Publication Data

US 2006/0150113 A1  Jul. 6, 2006

(30) Foreign Application Priority Data

Dec. 14, 2004  (JP)  ............................. 2004-361217

(51) Int. Cl.
G09G 5/08 (2006.01)
G06F 3/033 (2006.01)
G06T 17/00 (2006.01)
G06K 7/10 (2006.01)
A63F 3/00 (2006.01)
A63F 9/24 (2006.01)
A63F 13/00 (2006.01)
G06F 17/00 (2006.01)
G06F 19/00 (2006.01)

(52) U.S. Cl. .................. 345/158; 345/420; 235/462.11; 273/237; 273/284; 463/36; 463/37; 463/11

(58) Field of Classification Search ................. 345/420, 345/158; 235/462.11; 273/237, 284; 463/36, 463/37, 11

See application file for complete search history.

(56) References Cited

U.S. PATENT DOCUMENTS

| | | | | |
|---|---|---|---|---|
| 5,586,292 A | * | 12/1996 | Yamaguchi | 711/114 |
| 6,151,564 A | * | 11/2000 | Vescovi et al. | 702/150 |
| 6,178,412 B1 | * | 1/2001 | Ratzenberger et al. | 705/408 |
| 6,712,268 B1 | * | 3/2004 | Mason et al. | 235/383 |
| 6,865,299 B1 | * | 3/2005 | Nakayama | 382/246 |
| 7,204,428 B2 | * | 4/2007 | Wilson | 235/494 |

(Continued)

FOREIGN PATENT DOCUMENTS

JP  11-120285  4/1999

(Continued)

*Primary Examiner*—Xiao M Wu
*Assistant Examiner*—David T Welch
(74) *Attorney, Agent, or Firm*—Finnegan, Henderson, Farabow, Garrett & Dunner, L.L.P.

(57) ABSTRACT

An information processing apparatus includes the following elements. An image data acquisition unit acquires image data of a captured image including a code having a fixed area in which a predetermined fixed area code is formed and a variable area in which a variable area code formed by a combination of a plurality of codes is formed. A fixed area code recognition unit analyzes the captured image to recognize the predetermined fixed area code of the fixed area. A variable area code default value setting unit sets the default value of the variable area code based on the predetermined fixed area code. A variable area code recognition unit analyzes the captured image to recognize the variable area code. A comparator compares the variable area code with the default value to determine the difference therebetween. A command designation unit designates a command to be executed based on the difference.

11 Claims, 27 Drawing Sheets

U.S. PATENT DOCUMENTS

| | | | |
|---|---|---|---|
| 7,340,076 B2 * | 3/2008 | Stach et al. | 382/100 |
| 7,397,464 B1 * | 7/2008 | Robbins et al. | 345/173 |
| 7,433,580 B1 * | 10/2008 | Terashita et al. | 386/95 |
| 2001/0044858 A1 * | 11/2001 | Rekimoto | 710/1 |
| 2002/0009395 A1 * | 1/2002 | Hirono et al. | 422/67 |
| 2002/0049775 A1 * | 4/2002 | Friedrich et al. | 707/104.1 |
| 2003/0171142 A1 * | 9/2003 | Kaji et al. | 463/11 |
| 2003/0182100 A1 * | 9/2003 | Plastina et al. | 704/1 |
| 2004/0128196 A1 * | 7/2004 | Shibuno | 705/14 |
| 2004/0145755 A1 * | 7/2004 | Ishiguro | 358/1.1 |
| 2004/0161246 A1 * | 8/2004 | Matsushita et al. | 398/187 |
| 2004/0190865 A1 * | 9/2004 | Nomura et al. | 386/46 |

FOREIGN PATENT DOCUMENTS

| | | |
|---|---|---|
| JP | 2000-82107 | 3/2000 |
| JP | 2000-82108 | 3/2000 |
| JP | 2000-163656 | 6/2000 |
| JP | 2000-322602 | 11/2000 |
| JP | 2001-143083 | 5/2001 |
| JP | 2003-196588 | 7/2003 |
| JP | 2004-102729 | 4/2004 |

* cited by examiner

FIG. 5

| FIXED AREA CODE | VARIABLE AREA CODE DEFAULT VALUE | COMMAND TABLE |
|---|---|---|
| AAA | PATTERN A | PATTERN A-1 |
| BBB | PATTERN B | PATTERN B-3 |
| ... | ... | ... |

PATTERN A-1

| DIFFERENCE VALUE | COMMAND CHARACTER A DISPLAY |
|---|---|
| 0 | ATTACK |
| 1 | DEFENSE |
| 2 | ESCAPE |
| 3 | ITEM USE |
| 4 | ... |
| ... | ... |

PATTERN B-3

| DIFFERENCE VALUE | COMMAND CHARACTER B DISPLAY |
|---|---|
| 0 | STAND |
| 1 | SIT |
| 2 | TURN RIGHT |
| 3 | TURN LEFT |
| 4 | ... |
| ... | ... |

63

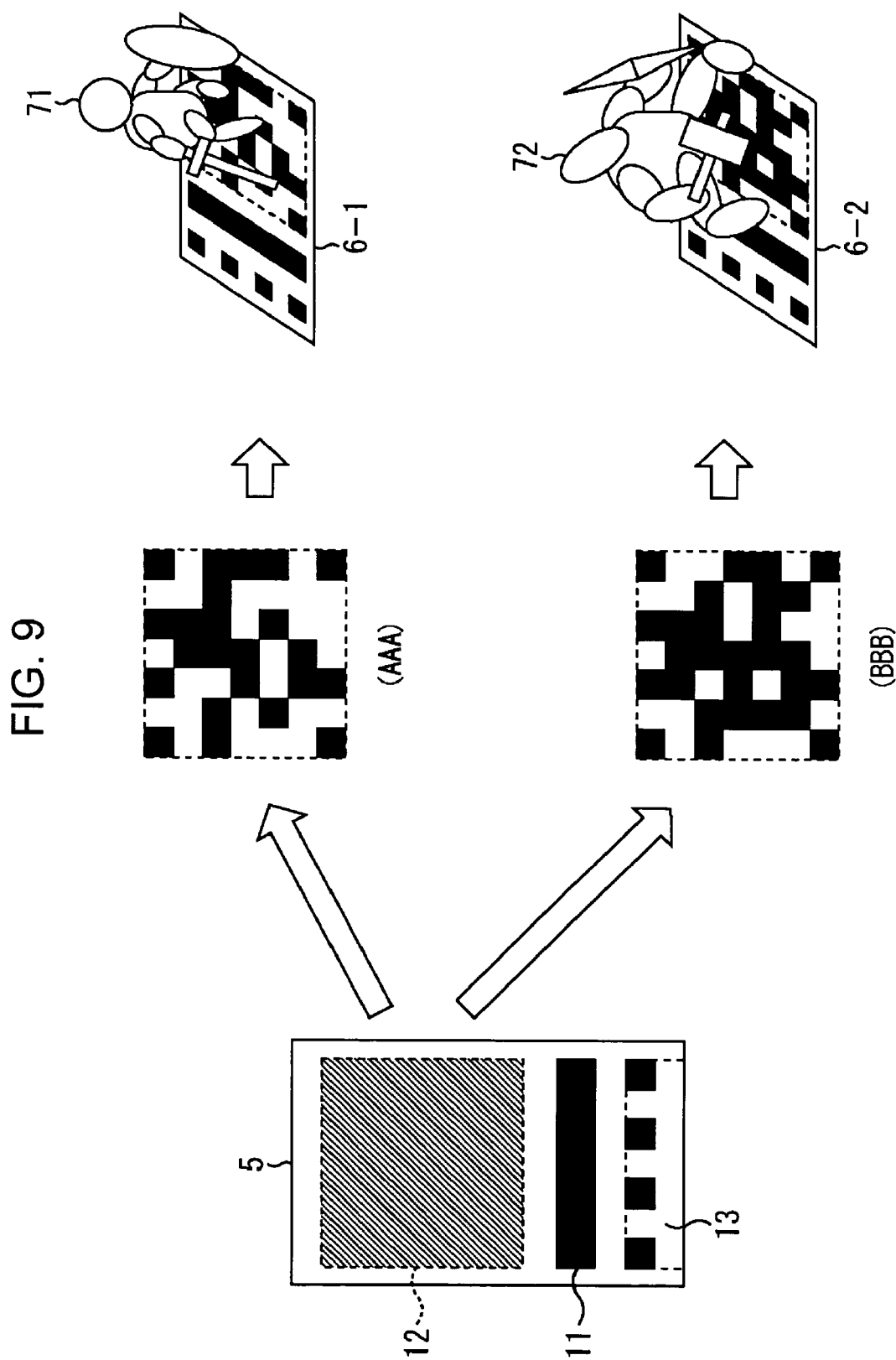

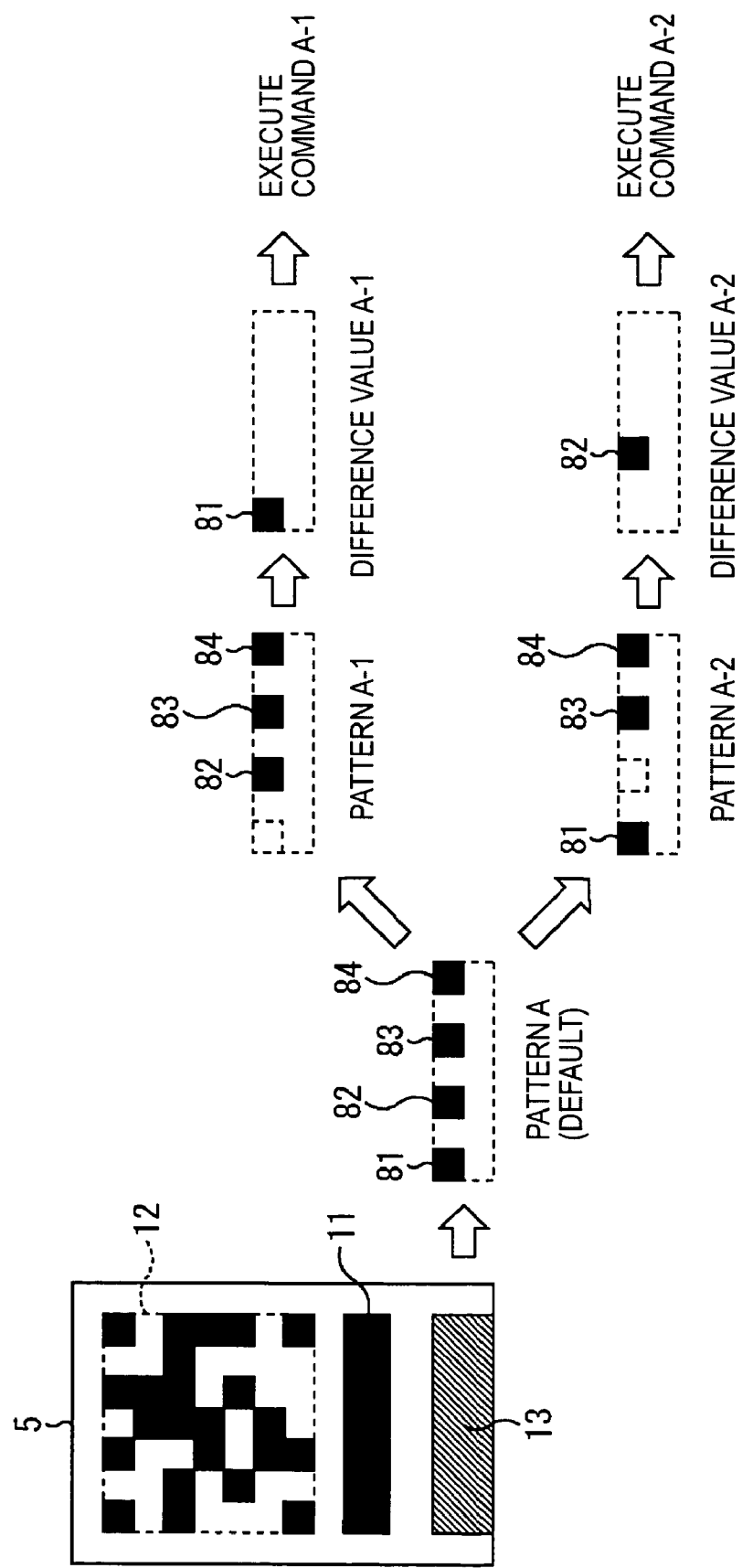

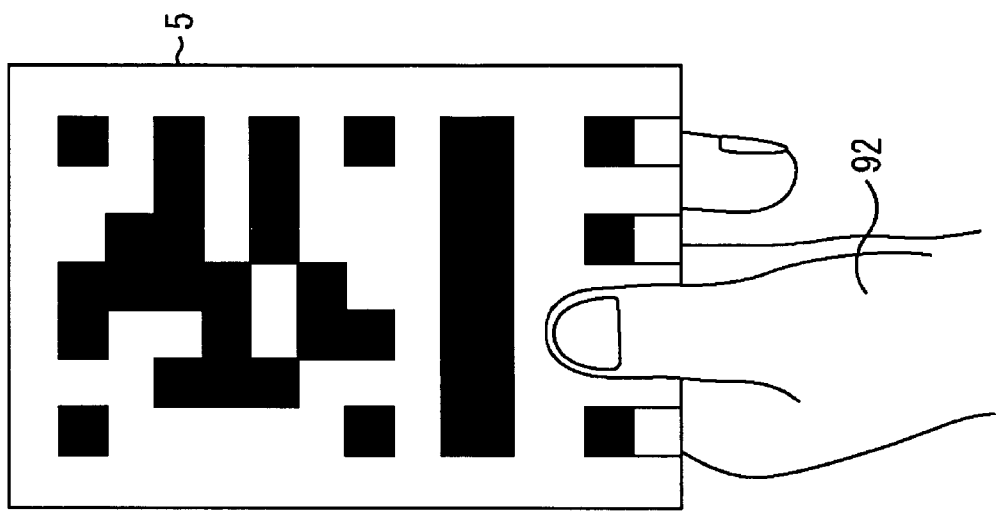
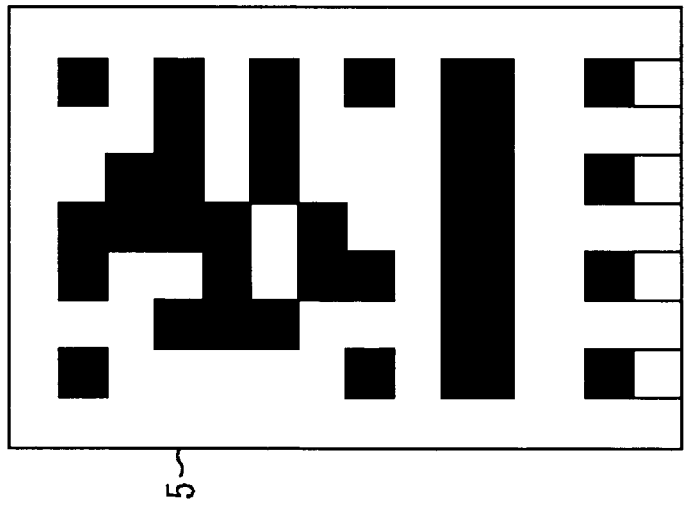

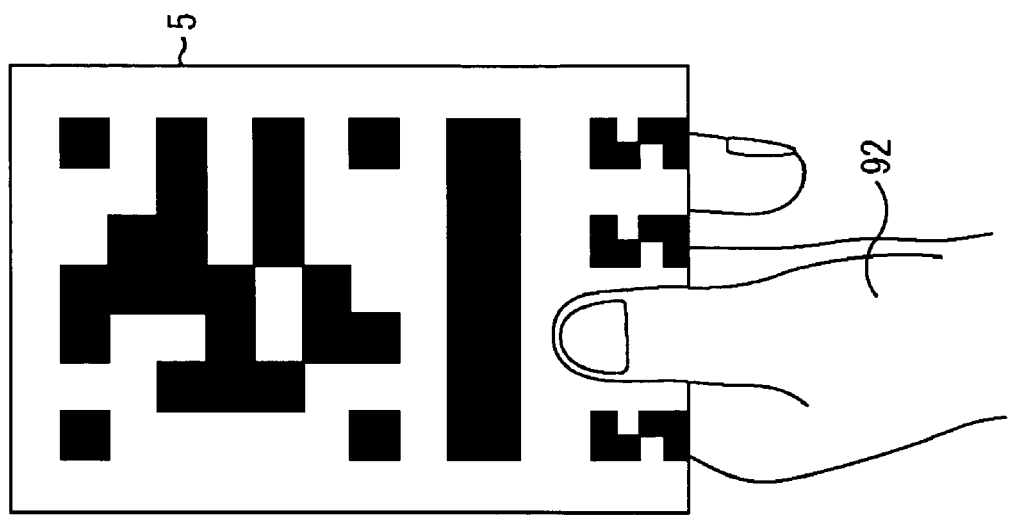
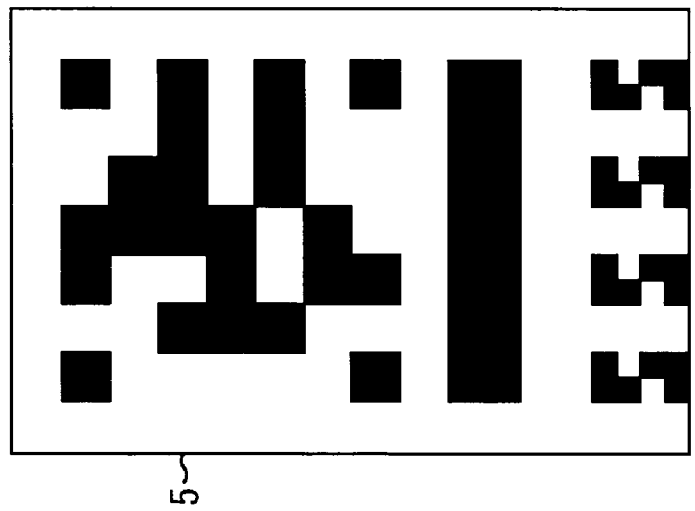

| PATTERN A-5 | | | |
|---|---|---|---|
| DIFFERENCE VALUE CHANGE PATTERN | | COMMAND | |
| 1 | 3 | 2 | DANCE A |
| 1 | 4 | 5 | DEADLY BLOW B |
| 2 | 3 | 2 | CONVERSATION C |
| 3 | 6 | 4 | SURRENDER D |
| 4 | 1 | 3 | SPECIAL ITEM USE E |
| ... | ... | ... | ... |

INFORMATION PROCESSING APPARATUS AND METHOD, INPUT DEVICE AND METHOD, PROGRAM, AND INFORMATION PROCESSING SYSTEM

CROSS REFERENCES TO RELATED APPLICATIONS

The present invention contains subject matter related to Japanese Patent Application JP 2004-361217 filed in the Japanese Patent Office on Dec. 14, 2004, the entire contents of which are incorporated herein by reference.

BACKGROUND OF THE INVENTION

1. Field of the Invention

The present invention relates to information processing apparatuses and methods, input devices and methods, programs, and information processing systems. More particularly, the invention relates to an information processing apparatus and method, an input device and method, a program, and an information processing system that provide a user interface which can be created and operated inexpensively and which allows a user to input a more variety of operational instructions easily by utilizing an identifier which can be partially or entirely changed as image information.

2. Description of the Related Art

The following technique is known, for example, as disclosed in Japanese Unexamined Patent Application Publication No. 2000-322602. A two-dimensional barcode printed on a card or a paper medium is imaged with a camera and the pattern of the imaged barcode is read so that a computer graphics image (hereinafter referred to as a "CG image") corresponding to the read pattern is displayed on, for example, a television screen as if a three-dimensional object exist on the two-dimensional barcode.

An information processing apparatus that performs the above-described synthesizing processing first specifies the position of the two-dimensional barcode in a three-dimensional space, and also reads information concerning the two-dimensional barcode to specify a CG image object corresponding to the read information. The information processing apparatus then performs image processing so that the CG image object can be superimposed on the two-dimensional barcode in a three-dimensional space to combine the CG image with the captured image. As a result, the image processing apparatus displays a synthesized image as if the CG image object were positioned on the two-dimensional barcode.

Such a technique for creating virtual space images is applied to, so-called "videogames", played by a user by using a television receiver as a monitor.

SUMMARY OF THE INVENTION

In the above-described technique, however, although a predetermined CG image (for example, a game character image), in accordance with a two-dimensional barcode which is read with a camera can be displayed, it is difficult for a user to give instructions to the character image any further. For example, although the user can display a game character CG image on a monitor in accordance with the image pattern of a two-dimensional barcode read by a camera, it is difficult for the user to input an operation command any further to cause the game character to, for example, stand or sit.

It is possible to display a character (CG image), which is a moving image, with a predetermined motion in accordance with the image pattern of a two-dimensional barcode. In this case, however, basically, only one type of motion can be registered for one image pattern. Therefore, it is difficult for the user to give instructions to the displayed CG image character any further. A plurality of motions may be registered for one image pattern of a two-dimensional barcode, and a certain motion can be selected among the registered motions when displaying the image. In this case, however, a motion is selected merely randomly, and it is difficult for the user to select a desired motion. In this case, also, the user is unable to give instructions to the displayed CG image character any further.

That is, in the above type of system, it is difficult for the user to input a plurality of instructions into one two-dimensional barcode. Conversely, to input a plurality of instructions, it is necessary for the user to prepare a plurality of two-dimensional barcodes, which accompanies complicated operations, such as replacing two-dimensional barcodes, thereby making the input operation complicated.

It is thus desirable to provide an inexpensive interface exhibiting high operability by allowing a user to identify a plurality of items of information by using one variable identifier.

According to an embodiment of the present invention, there is provided an information processing apparatus including image data acquisition means for acquiring image data of a captured image obtained by an imaging portion, the captured image including a code having a fixed area in which a predetermined fixed area code is formed and a variable area in which a variable area code formed by a combination of a plurality of codes is formed, fixed area code recognition means for analyzing the captured image acquired by the image data acquisition means to recognize the predetermined fixed area code of the fixed area, variable area code default value setting means for setting the default value of the variable area code based on the predetermined fixed area code recognized by the fixed area code recognition means, variable area code recognition means for analyzing the captured image obtained by the image data acquisition means to recognize the variable area code of the code included in the captured image, comparison means for comparing the variable area code recognized by the variable area code recognition means with the default value set by the variable area code default value setting means to determine the difference between the variable area code and the default value, and command designation means for designating a command to be executed based on the difference obtained by the comparison means.

The value of the entire variable area code formed in the variable area may be set to be the default value, and the variable area code may be changed by concealing part of or the entirety of the variable area code.

The state in which no variable area code is formed in the variable area may be set to be the default value, and the variable area code may be changed by adding a code to the variable area.

The information processing apparatus may further include code table storage means for storing a code table, which is table information for associating the fixed area code with the default value. The variable area code default value setting means may set the default value corresponding to the fixed area code by referring to the code table stored in the code table storage means.

The information processing apparatus may further include command table storage means for storing a command table, which is table information for associating the difference with the command. The command designation means may designate the command corresponding to the difference by referring to the command table stored in the command table storage means.

The information processing apparatus may further include guide portion recognition means for recognizing a guide portion, which is a basis for specifying a position of the fixed area and a position of the variable area included in the code, to specify a position of the guide portion.

According to another embodiment of the present invention, there is provided an information processing method including the steps of acquiring image data of a captured image obtained by an imaging portion, the captured image including a code having a fixed area in which a predetermined fixed area code is formed and a variable area in which a variable area code formed by a combination of a plurality of codes is formed, recognizing the predetermined fixed area code of the fixed area by analyzing the captured image, setting the default value of the variable area code based on the recognized predetermined fixed area code, recognizing the variable area code of the code included in the captured image by analyzing the captured image, comparing the recognized variable area code with the set default value to determine the difference between the variable area code and the default value, and designating a command to be executed based on the determined difference.

According to another embodiment of the present invention, there is provided a program including the steps of acquiring image data of a captured image obtained by an imaging portion, the captured image including a code having a fixed area in which a predetermined fixed area code is formed and a variable area in which a variable area code formed by a combination of a plurality of codes is formed, recognizing the predetermined fixed area code of the fixed area by analyzing the captured image, setting the default value of the variable area code based on the recognized predetermined fixed area code, recognizing the variable area code of the code included in the captured image by analyzing the captured image, comparing the recognized variable area code with the set default value to determine the difference between the variable area code and the default value, and designating a command to be executed based on the determined difference.

According to the above-described information processing apparatus, method, and program, image data of a captured image obtained by an imaging portion is acquired, the captured image including a code having a fixed area in which a predetermined fixed area code is formed and a variable area in which a variable area code formed by a combination of a plurality of codes is formed. The captured image is analyzed to recognize the predetermined fixed area code of the fixed area. The default value of the variable area code is set based on the recognized predetermined fixed area code. The captured image is analyzed to recognize the variable area code of the code included in the captured image. The recognized variable area code is compared with the set default value to determine the difference between the variable area code and the default value. A command to be executed is designated based on the determined difference.

According to another embodiment of the present invention, there is provided an input device including operation receiving means for receiving an operation performed on a code by a user and showing the code which is changed by the received operation to an imaging portion of an information processing apparatus, thereby inputting information corresponding to the operation into the information processing apparatus.

The above-described operation may be an operation for concealing part of or the entirety of the code.

The above-described operation may be an operation for adding a new code to the code.

According to the above-described input device, an operation performed on a code by a user is received, and the code which is changed by the received operation is shown to the imaging portion of an information processing apparatus, thereby inputting information corresponding to the operation into the information processing apparatus.

According to another embodiment of the present invention, there is provided an information processing system including an information processing apparatus for reading a code included in an image, and an input device for inputting information into the information processing apparatus. The information processing apparatus includes image data acquisition means for acquiring image data of a captured image obtained by an imaging portion, the captured image including a code having a fixed area in which a predetermined fixed area code is formed and a variable area in which a variable area code formed by a combination of a plurality of codes is formed, fixed area code recognition means for analyzing the captured image acquired by the image data acquisition means to recognize the predetermined fixed area code of the fixed area, variable area code default value setting means for setting the default value of the variable area code based on the predetermined fixed area code recognized by the fixed area code recognition means, variable area code recognition means for analyzing the captured image obtained by the image data acquisition means to recognize the variable area code of the code included in the captured image, comparison means for comparing the variable area code recognized by the variable area code recognition means with the default value set by the variable area code default value setting means to determine the difference between the variable area code and the default value, and command designation means for designating a command to be executed based on the difference obtained by the comparison means. The input device includes operation receiving means for receiving an operation performed on the code by a user and showing the code which is changed by the received operation to an imaging portion of the information processing apparatus, thereby inputting information corresponding to the operation into the information processing apparatus.

The above-described image processing system includes the information processing apparatus and the input device. In the information processing apparatus, image data of a captured image obtained by an imaging portion is acquired, the captured image including a code having a fixed area in which a predetermined fixed area code is formed and a variable area in which a variable area code formed by a combination of a plurality of codes is formed. The captured image is analyzed to recognize the predetermined fixed area code of the fixed area. The default value of the variable area code is set based on the recognized predetermined fixed area code. The captured image is analyzed to recognize the variable area code of the code included in the captured image. The recognized variable area code is compared with the set default value to determine the difference between the variable area code and the default value. A command to be executed is designated based on the determined difference. In the input device, an operation performed on a code by a user is received, and the code which is changed by the received operation is shown to an imaging portion of an information processing apparatus, thereby inputting information corresponding to the operation into the information processing apparatus.

According to an embodiment of the present invention, a user interface which can be created and operated inexpensively and which allows a user to input a wider variety of input operations easily can be provided.

BRIEF DESCRIPTION OF THE DRAWINGS

FIG. 5 illustrates an example of the configuration of a code table;

FIGS. 6A and 6B illustrate examples of the configuration of a command table;

FIG. 9 illustrates examples of processing for a fixed area code;

FIG. 10 illustrates examples of processing for a variable area code;

FIGS. 13A and 13B illustrate another example of a cell pattern in a variable area;

FIGS. 14A and 14B illustrate still another example of a cell pattern in a variable area;

FIG. 20 illustrates another example of the configuration of the command table;

DESCRIPTION OF THE PREFERRED EMBODIMENTS

Figure 1:
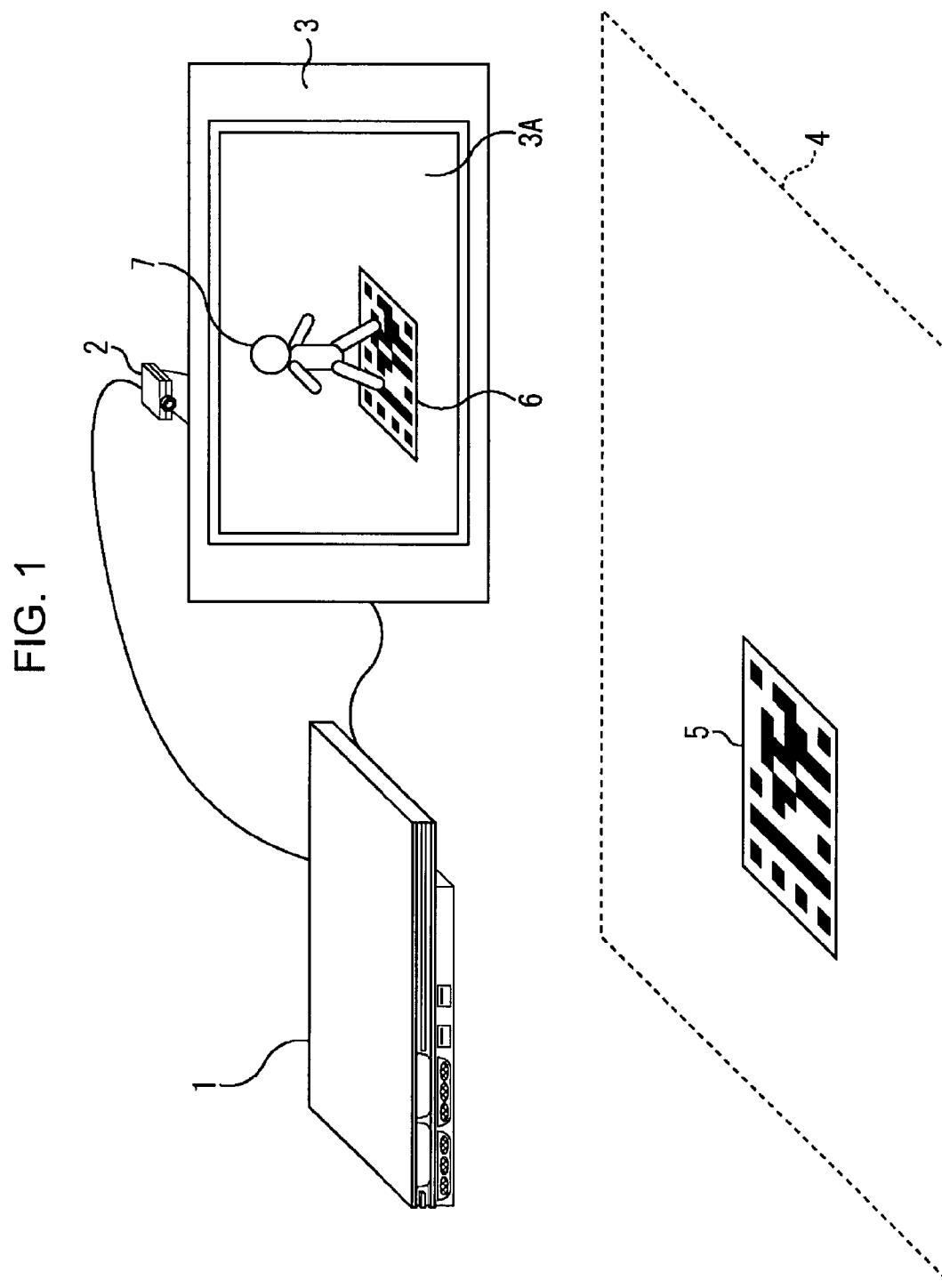
FIG. 1 illustrates an example of the configuration of an information processing system according to an embodiment of the present invention.

Before describing an embodiment of the present invention, the correspondence between the features of the claims and the specific elements disclosed in an embodiment of the present invention is discussed below. This description is intended to assure that an embodiment supporting the claimed invention is described in this specification. Thus, even if an element in the following embodiment is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Furthermore, this description should not be construed as restricting that all the aspects of the invention disclosed in the embodiment are described in the claims. That is, the description does not deny the existence of aspects of the present invention that are described in the embodiment but not claimed in the invention of this application, i.e., the existence of aspects of the present invention that in future may be claimed by a divisional application, or that may be additionally claimed through amendments.

According to an embodiment of the present invention, there is provided an information processing apparatus (for example, an information processing apparatus shown in FIG. 1) for reading a code (for example, a two-dimensional barcode shown in FIG. 2) included in an image. The information processing apparatus includes image data acquisition means (for example, an image data acquisition unit shown in FIG. 4) for acquiring image data of a captured image obtained by an imaging portion (for example, a camera shown in FIG. 1), the captured image including a code having a fixed area (for example, a fixed area shown in FIG. 2) in which a predetermined fixed area code is formed and a variable area (for example, a variable area shown in FIG. 2) in which a variable area code formed by a combination of a plurality of codes is formed, fixed area code recognition means (for example, a fixed area code recognition portion shown in FIG. 4) for analyzing the captured image acquired by the image data acquisition means to recognize the predetermined fixed area code of the fixed area, variable area code default value setting means (for example, a variable area code default value setting portion shown in FIG. 4) for setting the default value of the variable area code based on the predetermined fixed area code recognized by the fixed area code recognition means, variable area code recognition means (for example, a variable area code recognition portion shown in FIG. 4) for analyzing the captured image obtained by the image data acquisition means to recognize the variable area code of the code included in the captured image, comparison means (for example, a pattern comparator shown in FIG. 4) for comparing the variable area code recognized by the variable area code recognition means with the default value set by the variable area code default value setting means to determine the difference between the variable area code and the default value, and command designation means (for example, a command designation portion shown in FIG. 4) for designating a command to be executed based on the difference obtained by the comparison means.

The value of the entire variable area code formed in the variable area is set to be the default value, and the variable area code is changed by concealing part of or the entirety of the variable area code (for example, as shown in FIGS. 10 through 15B).

Figure 16A:
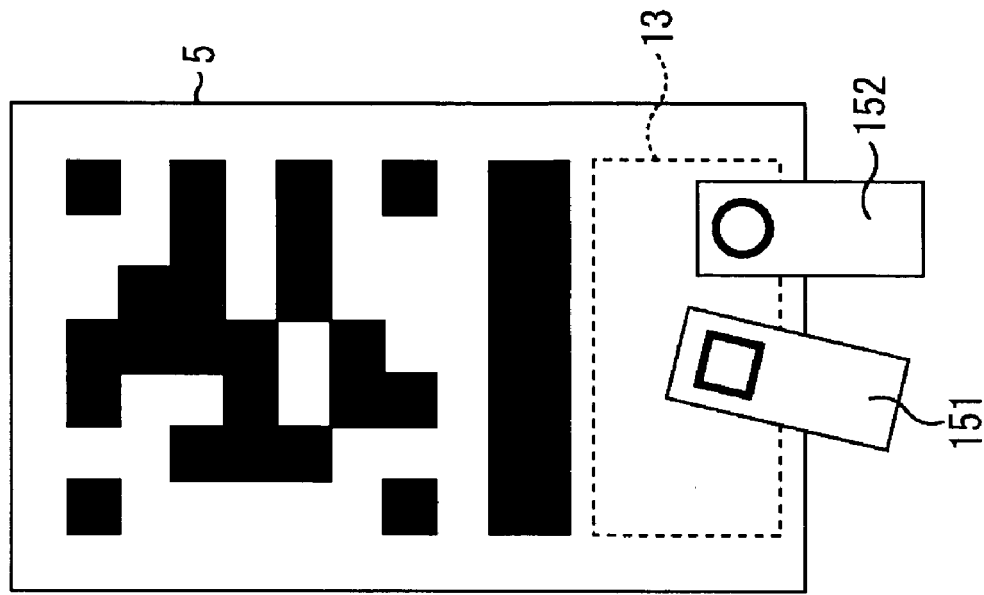
FIGS. 16A and 16B illustrate other examples of cell patterns in a variable area.
Figure 16B:
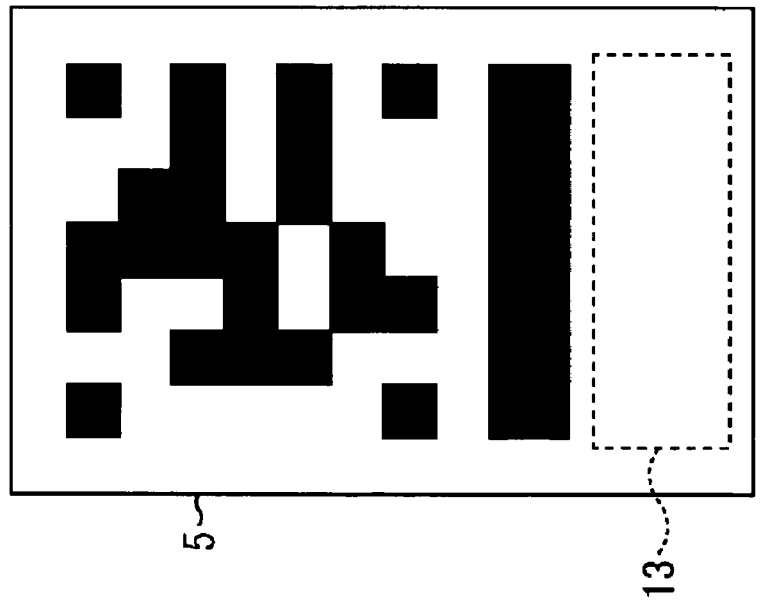

A state in which no variable area code is formed in the variable area is set to be the default value, and the variable area code is changed by adding a code to the variable area (for example, as shown in FIGS. 16A and 16B).

The information processing apparatus further includes code table storage means (for example, a code table storage portion shown in FIG. 4) for storing a code table, which is table information for associating the fixed area code with the default value. The variable area code default value setting means sets the default value corresponding to the fixed area code by referring to the code table stored in the code table storage means.

The information processing apparatus further includes command table storage means (for example, a command table storage portion shown in FIG. 4) for storing a command table, which is table information for associating the difference with the command. The command designation means designates the command corresponding to the difference by referring to the command table stored in the command table storage means.

The information processing apparatus further includes guide portion recognition means (for example, a guide portion recognition portion shown in FIG. 4) for recognizing a guide portion (for example, a guide portion shown in FIG. 2), which is a basis for specifying a position of the fixed area and a position of the variable area included in the code, to specify a position of the guide portion.

According to an embodiment of the present invention, there is provided an information processing method for an information processing apparatus (for example, the information processing apparatus shown in FIG. 1) for reading a code (for example, the two-dimensional barcode shown in FIG. 2) included in an image. The information processing method includes the steps of acquiring image data of a captured image obtained by an imaging portion (for example, the camera shown in FIG. 1) (for example, step S21 in FIG. 8), the captured image including a code having a fixed area (for example, the fixed area shown in FIG. 2) in which a predetermined fixed area code is formed and a variable area (for example, the variable area shown in FIG. 2) in which a variable area code formed by a combination of a plurality of codes is formed, recognizing the predetermined fixed area code of the fixed area by analyzing the captured image (for example, step S25 in FIG. 8), setting the default value of the variable area code based on the recognized predetermined fixed area code (for example, step S27 in FIG. 8), recognizing the variable area code of the code included in the captured image by analyzing the captured image (for example, step S28 in FIG. 8), comparing the recognized variable area code with the set default value to determine the difference between the variable area code and the default value (for example, step S29 in FIG. 8), and designating a command to be executed based on the determined difference (for example, step S31 or S32 in FIG. 8).

In a program according to an embodiment of the present invention, the correspondence between the features of the claims and the specific elements disclosed in an embodiment is similar to that of the information processing method.

According to another embodiment of the present invention, there is provided an input device (for example, a card 5 shown in FIG. 1) for inputting information into an information processing apparatus (for example, the information processing apparatus shown in FIG. 1) for reading a code (for example, the two-dimensional barcode shown in FIG. 2) included in a captured image. The input device includes operation receiving means (for example, the variable area shown in FIG. 2) for receiving an operation performed on the code by a user and showing the code which is changed by the received operation to an imaging portion of the information processing apparatus, thereby inputting information corresponding to the operation into the information processing apparatus.

The above-described operation is an operation for concealing part of or the entirety of the code (for example, as shown in FIGS. 10 through 15B).

The above-described operation is an operation for adding a new code to the code (for example, as shown in FIGS. 16A and 16B).

According to another embodiment of the present invention, there is provided an information processing system (for example, an information processing system shown in FIG. 1) including an information processing apparatus (for example, the information processing apparatus shown in FIG. 1) for reading a code (for example, the two-dimensional barcode shown in FIG. 2) included in an image, and an input device (for example, the card 5 shown in FIG. 1) for inputting information into the information processing apparatus. The information processing apparatus includes image data acquisition means (for example, the image data acquisition portion shown in FIG. 4) for acquiring image data of a captured image obtained by an imaging portion (for example, the camera shown in FIG. 1), the captured image including a code having a fixed area (for example, the fixed area shown in FIG. 2) in which a predetermined fixed area code is formed and a variable area (for example, the variable area shown in FIG. 2) in which a variable area code formed by a combination of a plurality of codes is formed, fixed area code recognition means (for example, the fixed area code recognition portion shown in FIG. 4) for analyzing the captured image acquired by the image data acquisition means to recognize the predetermined fixed area code of the fixed area, variable area code default value setting means (for example, the variable area code default value setting portion shown in FIG. 4) for setting the default value of the variable area code based on the predetermined fixed area code recognized by the fixed area code recognition means, variable area code recognition means (for example, the variable area code recognition portion shown in FIG. 4) for analyzing the captured image obtained by the image data acquisition means to recognize the variable area code of the code included in the captured image, comparison means (for example, the pattern comparator shown in FIG. 4) for comparing the variable area code recognized by the variable area code recognition means with the default value set by the variable area code default value setting means to determine the difference between the variable area code and the default value, and command designation means (for example, the command designation portion shown in FIG. 4) for designating a command to be executed based on the difference obtained by the comparison means. The input device includes operation receiving means (for example, the variable area shown in FIG. 2) for receiving an operation performed on the code by a user and showing the code which is changed by the received operation to an imaging portion of the information processing apparatus, thereby inputting information corresponding to the operation into the information processing apparatus.

An embodiment of the present invention is described below with reference to the accompanying drawings.

An information processing system according to an embodiment of the present invention shown in FIG. 1 includes an information processing apparatus 1, a camera 2, and a monitor 3. The information processing system reads a two-dimensional barcode (hereinafter referred to as a "2D code") and performs image processing according to the read pattern of the 2D code.

The information processing apparatus 1 is electrically connected to the camera 2 and the monitor 3. The information processing apparatus 1 is a so-called "video game machine", which displays images in a video game on the monitor 3 and allows a user to play the video game.

The camera 2 includes a lens and an imaging device, such as a charge-coupled device (CCD) or a complementary metal oxide semiconductor (CMOS), for reading out electric charge, and converts light into an electric signal. The camera 2 reads an image in a range 4, which is a photographing range determined by the installation place and direction of the camera 2, as an electric signal (image data) and supplies the read image to the information processing apparatus 1. The information processing apparatus 1 supplies the image data to the monitor 3 and allows the monitor 3 to display the image data, and if a 2D code is observed in the image, the information processing apparatus 1 executes processing specified by the 2D code.

For example, if a card 5 having a 2D code printed thereon is installed in the range 4, as shown in FIG. 1, the camera 2 reads the image containing the card 5. Upon receiving this image from the camera 2, the information processing apparatus 1 detects the 2D code printed on the card 5 from the image and analyzes the pattern of the 2D code to execute the processing in accordance with the pattern. For example, the information processing apparatus 1 selects a character in game processing corresponding to the 2D code of the card 5 and combines the CG image of the selected character with the captured image supplied from the camera 2 to display the synthesized image on the monitor 3. According to the processing performed by the information processing apparatus 1, in FIG. 1, in a display image 3A displayed on the monitor 3, a character CG image 7 corresponding to the 2D code printed on the card 5 is superimposed on a card image 6, which is the image of the card 5 captured by the camera 2.

As discussed above, in the processing for allowing a user to play a video game, the information processing apparatus 1 reads a 2D code contained in an image captured by the camera 2, and combines the character CG image 7 corresponding to the 2D code with the card image 6 so that the CG image 7 is superimposed on the card image 6, and displays the synthesized image on the monitor 3 as the display image 3A.

The material of the card 5 may be any type, such as paper, plastic, or a metal. The card 5 may also be any shape, such as a circle, a square, a rectangle, or a triangle. The card 5 may have a desired thickness, and may be three-dimensional. The surface of the card 5 on which the 2D code is printed is not restricted to planar, and may be any shape, such as spherical or conical, as long as it allows the information processing apparatus 1 to recognize the 2D code.

Figure 2:
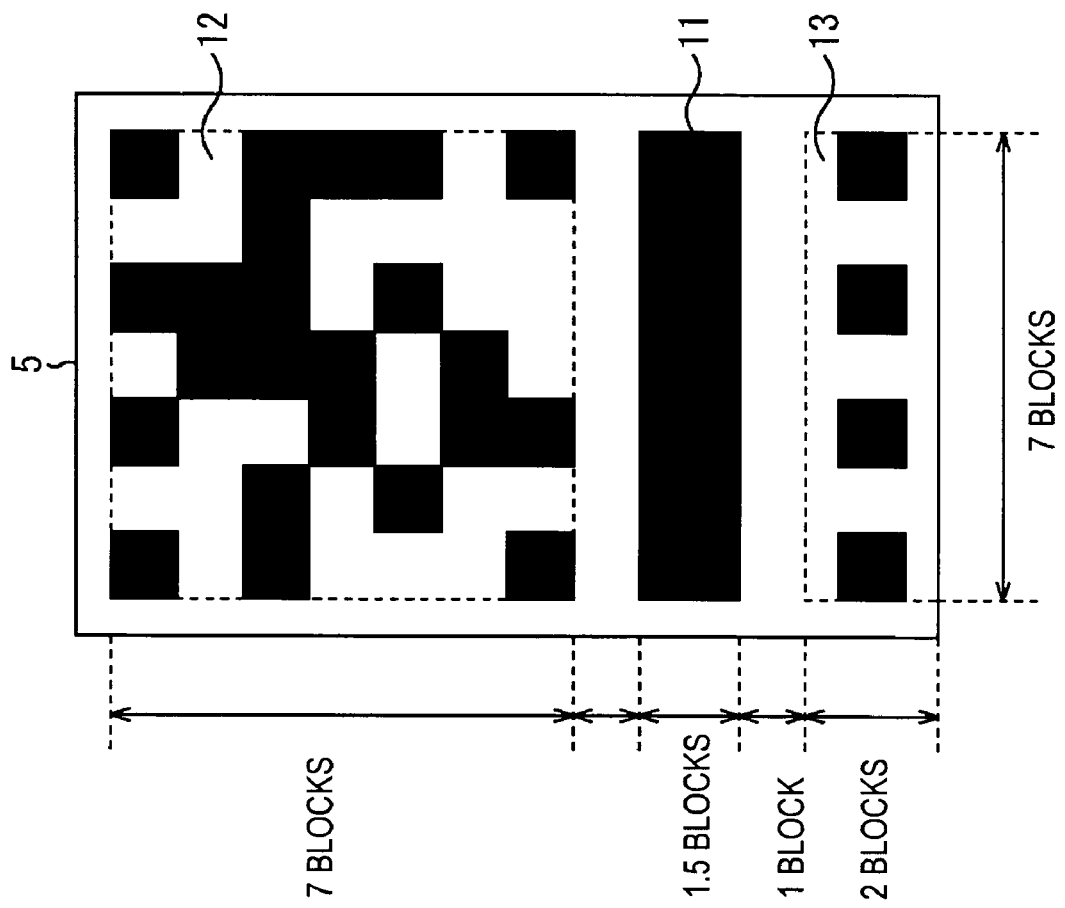
FIG. 2 illustrates an example of the configuration of a two-dimensional barcode (2D code) of a card shown in FIG. 1.

FIG. 2 illustrates an example of the configuration of the 2D code printed on the card 5. The 2D code uses one block as one unit, and has 12.5 blocks in the vertical direction and 7 blocks in the horizontal directions in a rectangular range, in which three areas, i.e., a guide portion 11, a fixed area 12, and a variable area 13, are disposed separately from each other by one block.

The guide portion 11 is formed of a large rectangular cell having 1.5 blocks in the vertical direction and 7 blocks in the horizontal direction. The guide portion 11 allows the information processing apparatus 1 to recognize the positions of the fixed area 12 and the variable area 13. That is, the guide portion 11 has a simpler pattern than the fixed area 12 or the variable area 13 to allow the information processing apparatus 1 to easily specify the position of the guide portion 11. The information processing apparatus 1 first recognizes the guide portion 11 to specify the position thereof on three-dimensional coordinates, and then specifies the positions of the fixed area 12 and the variable area 13 based on the position of the guide portion 11 to read the code (pattern) of the card 5. To make the best use of the space of the guide portion 11, marks (logos) for information concerning the 2D code or commercials, may be indicated in the guide portion 11. Accordingly, the guide portion 11 may also be referred to as a "logo" portion.

In FIG. 2, the fixed area 12 is disposed above the guide portion 11 separately by one block. In the fixed area 12, square cells are two-dimensionally disposed in a 7×7-square area. Accordingly, the fixed area 12 formed of a set of cells is also referred to as a "cell portion". The pattern (cell pattern) of the fixed area 12 is fixed (not variable). The fixed area 12 indicates only one type of fixed information as the entire 7×7 blocks. The information processing apparatus 1 can obtain one type of information (fixed area code) represented by the pattern of the fixed area 12 correctly only when it reads the entire fixed area (cell pattern) 12.

The single cell pattern (fixed area code) formed in the fixed area 12 indicates only one type of information. More specifically, it is possible that the single cell pattern indicate that a plurality of processing jobs are sequentially executed. Even in this case, however, the processing (and the execution order or various conditions thereof) derived from the single cell pattern is uniquely determined. In other words, an area in which one predetermined fixed code is formed is the fixed area 12, and the code formed in the fixed area 12 is a fixed area code.

In FIG. 2, the variable area 13 is disposed below the guide portion 11 separately by one block at the side opposite to the fixed area 12 across the guide portion 11. The variable area 13 is a 2×7-block area and is formed of a set of cells, as in the fixed area 12. However, unlike the fixed area 12, the variable area 13 is a set of partial areas, each area (cell) having one type of information. That is, the variable area 13 is formed of a set of cell patterns indicating a plurality of types of information. The user partially conceals the cell patterns formed in the variable area 13 to prevent the camera 2 from reading the concealed portion so that the information processing apparatus 1 executes the processing represented by the concealed cell portion. In other words, an area in which a plurality of variable codes are formed is the variable area 13, and the codes formed in the variable area 13 are variable area codes.

For example, in FIG. 2, four cells indicated by black squares are formed in the variable area 13, and they have different types of information. In this case, if the user conceals one of the four cells, the information processing apparatus 1 determines from the unconcealed cells how the variable area 13 is changed to recognize which cell is concealed, and executes processing in accordance with the concealed cell.

That is, the user can input an instruction into the information processing apparatus 1 by concealing part of a set of cells in the variable area 13. Unlike the fixed area 12, the variable area 13 is formed so that the user can input a plurality of types of information by using the individual cell patterns. Additionally, the cell pattern as the entire variable area 13 may also represent another type of information.

Figure 3:
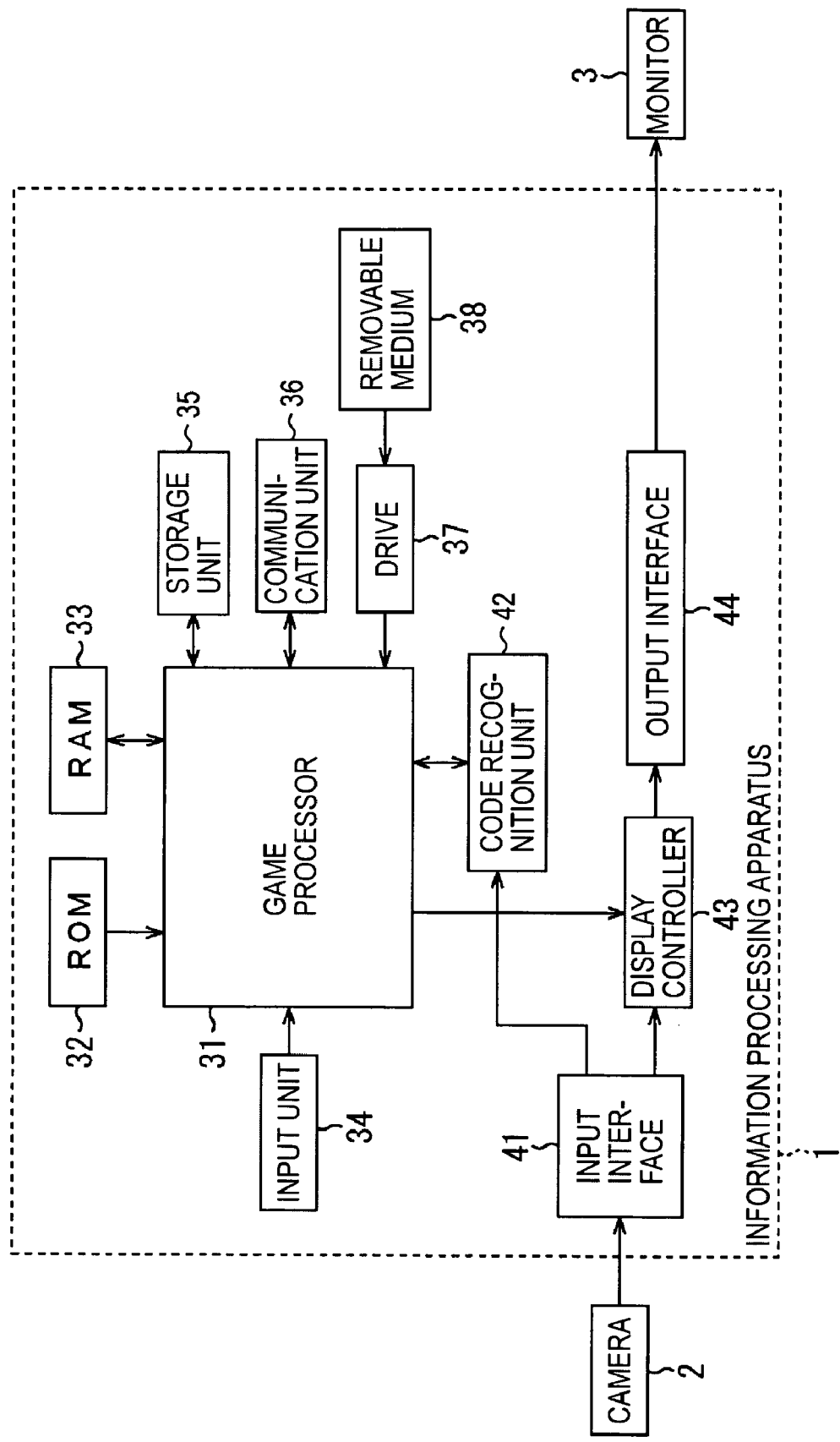
FIG. 3 is a block diagram illustrating an example of the internal configuration of an information processing apparatus shown in FIG. 1.

A description is now given of the information processing apparatus 1 shown in FIG. 1 performing the processing for reading the above-described 2D code. FIG. 3 is a block diagram illustrating the main internal configuration of the information processing apparatus 1 according to an embodiment of the present invention.

In FIG. 3, the information processing apparatus 1 includes a game processor 31, a read only memory (ROM) 32, a random access memory (RAM) 33, an input unit 34, a storage unit 35, a communication unit 36, a drive 37, a removable medium 38, an input interface 41, a code recognition unit 42, a display controller 43, and an output interface 44.

The game processor 31, which includes an arithmetic unit and a controller, controls the entire processing (game processing) concerning video games played by a user by using the ROM 32 or the RAM 33. That is, the game processor 31 is operated as a central processing unit (CPU) in the information processing apparatus 1 that performs the game processing.

The ROM 32, which is a read only mask ROM into which data and programs are written when manufacturing the information processing apparatus 1, supplies the data or programs to the game processor 31 as necessary. The RAM 33, which is a semiconductor memory that can update data, temporarily stores processing (program) which is being executed by the game processor 31 or data required for the processing by the game processor 31 under the control of the game processor 31. The input unit 34 includes input devices, for example, a keyboard, a mouse, and a joystick, and supplies an instruction input by the user by operating the input unit 34 to the game processor 31.

The storage unit 35 includes a non-volatile storage medium, such as a hard disk, which stores various items of information concerning programs and data executed by the game processor 31 and supplies the information to the game processor 31 if necessary. The communication unit 36 communicates with another information processing apparatus (not shown) connected to the communication unit 36 via a network (not shown) to send and receive information under the control of the game processor 31. The drive 37 drives the removable medium 38 installed in the drive 37 to read data stored in the removable medium 38 and supplies the read data to the game processor 31. The removable medium 38 is formed of a magnetic disk (including a flexible disk), an optical disc (including a compact disk read only memory (CD-ROM) and a digital versatile disk (DVD)), a magneto-optical disk (including a MiniDisc (MD) (trademark) miniature disk), a semiconductor memory, or a hard disk. The drive 37 reads the game program recorded in the removable medium 38 and causes the game processor 31 to execute the game program.

The input interface 41 is an interface for connecting the information processing apparatus 1 to an external device according to a predetermined method, such as universal serial bus (USB) or Institute Electrical and Electronic Engineers (IEEE) 1394, and for supplying information from the external device to the information processing apparatus 1. In FIG. 3, the input interface 41 is connected to the camera 2 and supplies image information supplied from the camera 2 to the code recognition unit 42.

The code recognition unit 42 recognizes the 2D code from an image captured by the camera 2 and obtained via the input interface 41 under the control of the game processor 31. Details of the code recognition unit 42 are given below. The code recognition unit 42 supplies a 2D-code recognition result to the game processor 31. The game processor 31 performs processing based on the received recognition result.

The display controller 43 has an image buffer memory (not shown), and performs processing for generating the display image 3A to be displayed on the monitor 3. For example, the display controller 43 combines a CG image supplied from the game processor 31 with the image captured by the camera 2 and obtained via the input interface 41 and supplies the synthesized image (synthesized image data) to the output interface 44 under the control of the game processor 31.

The output interface 44 is an interface connected to an external device, such as the monitor 3, to output image data, etc., supplied from the display controller 43 to the external device. In FIG. 3, the output interface 44 supplies the image data supplied from the display controller 43 to the monitor 3 at a predetermined time.

Figure 4:
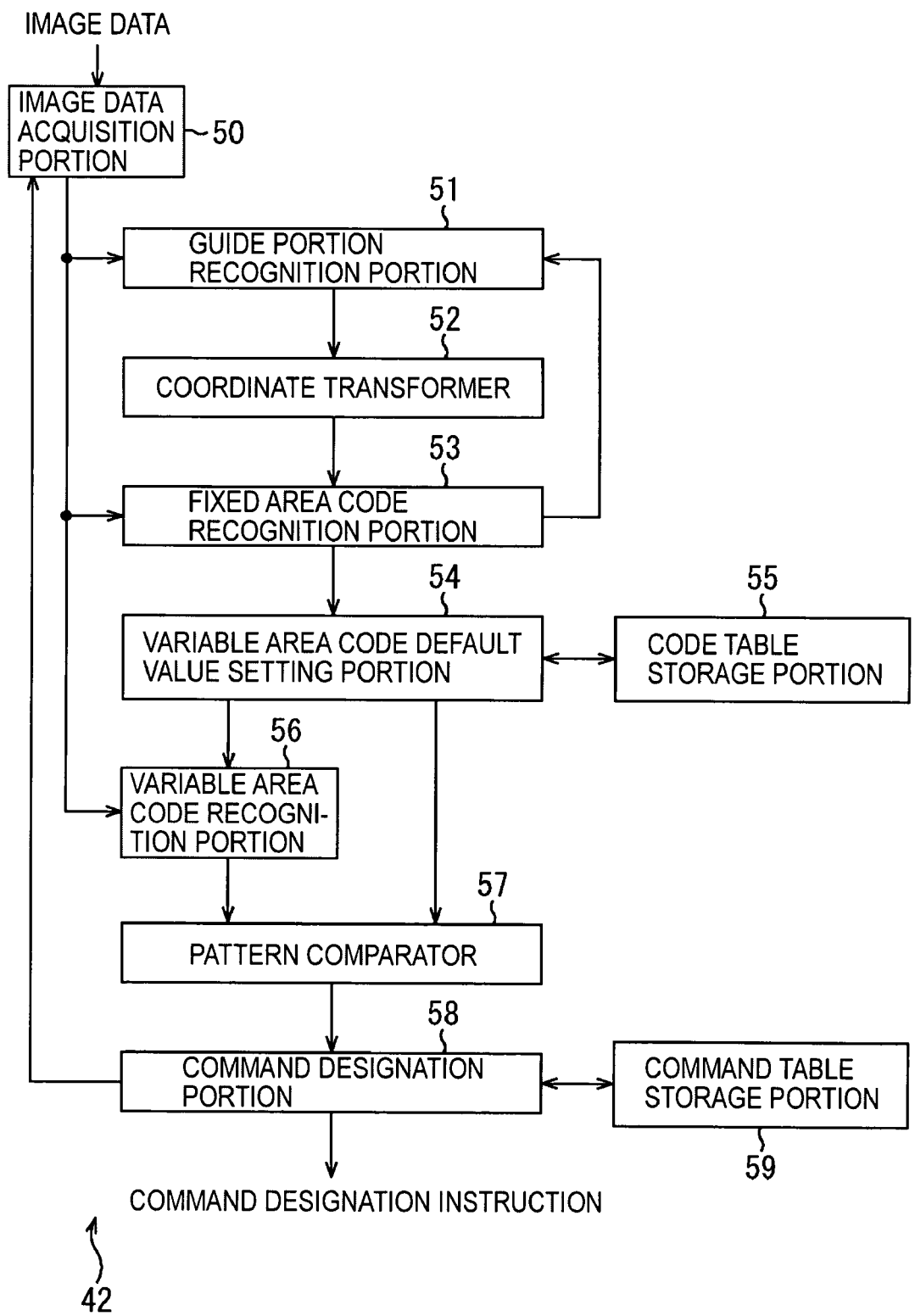
FIG. 4 is a block diagram illustrating an example of the detailed configuration of a code recognition unit shown in FIG. 3.

FIG. 4 is a block diagram illustrating a detailed configuration of the code recognition unit 42 shown in FIG. 3.

In FIG. 4, the code recognition unit 42 includes an image data acquisition portion 50, a guide portion recognition portion 51, a coordinate transformer 52, a fixed area code recognition portion 53, a variable area code default value setting portion 54, a code table storage portion 55, a variable area code recognition portion 56, a pattern comparator 57, a command designation portion 58, and a command table storage portion 59.

The image data acquisition portion 50 acquires each frame of image data of an image captured by the camera 2 via the input interface 41, and supplies frame images (image data) to the guide portion recognition portion 51, the fixed area code recognition portion 53, and the variable area code recognition portion 56.

The guide portion recognition portion 51 analyzes the captured image (frame images) obtained from the camera 2 and supplied from the image data acquisition portion 50 to recognize the guide portion 11 of the 2D code shown in FIG. 2. The guide portion recognition portion 51 then supplies the recognition result to the coordinate transformer 52.

The coordinate transformer 52 conducts coordinate transform on the captured image data supplied from the image data acquisition portion 50 according to a coordinate system which is obtained by recognizing the guide portion 11 by the guide portion recognition unit 51 so as to specify the positions of the fixed area 12 and the variable area 13 in a three-dimensional space. The coordinate transformer 52 then supplies information concerning the specified positions to the fixed area code recognition portion 53.

The fixed area code recognition portion 53 analyzes the image corresponding to the positions specified by the coordinate transformer 52 to recognize the code cell pattern of the fixed area 12. If the fixed area code recognition portion 53 fails to recognize the cell pattern of the fixed area 12, it supplies the recognition result (recognition failure result) to the guide portion recognition portion 51. The guide portion recognition portion 51 repeats the recognition processing on the guide portion 11 of the subsequent frame image. If the fixed area code recognition portion 53 successfully recognizes the code (fixed area code, i.e., the cell pattern) of the fixed area 12, it supplies the recognition result representing the recognized value to the variable area code default value setting portion 54.

The variable area code default value setting portion 54 refers to a code table stored in the code table storage portion 55 to specify a variable area code default value and a command table corresponding to the fixed area code supplied from the fixed area code recognition portion 53. The variable area code default value is an initial value (default value) of the variable area code (cell pattern) formed in the variable area 13. That is, the variable area code default value is the variable area code value when none of the cell pattern is concealed by the user (all the cell patterns formed in the variable area 13 are recognizable from the image captured by the camera 2). The command table is table information concerning a command (processing) corresponding to the recognized variable area code, and is stored in the command table storage portion 59, which is discussed below.

That is, the variable area code default value setting portion 54 sets information for assigning the processing corresponding to the fixed area code to the variable area code of the variable area 13. In other words, the processing corresponding to the variable area code of the variable area 13 is varied according to the value of the fixed area code.

The code table storage portion 55 prestores a code table, which is table information for assigning a variable area code default value and a command table to a fixed area code. Upon receiving the value of the fixed area code from the variable area code default value setting portion 54, the code table storage portion 55 returns information concerning the variable area code default value and the command table associated with the fixed area code value to the variable area code default value setting portion 54 on the basis of the stored code table.

The variable area code default value setting portion 54 supplies information concerning the variable area code default value and the command table to the pattern comparator 57, and also supplies information concerning the positions (coordinates) of the variable area 13 to the variable area code recognition portion 56 to cause the variable area code recognition portion 56 to start recognition processing for the variable area code.

The variable area code recognition portion 56 analyzes the captured image data supplied from the image data acquisition portion 50 based on the information concerning the positions (coordinates) of the variable area 13 supplied from the variable area code default value setting portion 54 to recognize the variable area code formed in the variable area 13. The variable area code recognition portion 56 then supplies the recognition result of the variable area code to the pattern comparator 57.

The pattern comparator 57 compares the variable area code default value (pattern) supplied from the variable area code default value setting portion 54 with the recognition result indicating the pattern of the variable area code supplied from the variable area code recognition portion 56 to determine the difference, i.e., the concealed portion of the variable area code. The pattern comparator 57 then supplies the difference information and the command table information to the command designation portion 58.

The command designation portion 58 specifies the command table from a plurality of command tables stored in the command table storage portion 59 based on the information concerning the command table supplied from the pattern comparator 57, and specifies a command corresponding to the difference information (difference value) supplied from the pattern comparator 57 by using the specified command table.

The command table storage portion 59 stores a plurality of command tables, which are discussed below. The command table is table information for associating a difference value with a command. The command table storage portion 59 supplies the command corresponding to the difference information (difference value) supplied from the command designation portion 58 to the command designation portion 58 by using the command table designated by the command table information supplied from the command designation portion 58.

The command designation portion 58 supplies an instruction (command designation instruction) to turn ON a command designation flag for designating the specified command to the game processor 31. The game processor 31 then turns ON the command designation flag based on the information to make a reservation for executing the command, and executes the designated command at a suitable time. Upon completing the command designation instruction, the command designation portion 58 causes the image data acquisition portion 50 to acquire the subsequent frame image (image data).

As described above, by performing the code recognition processing by using the individual elements, the code recognition unit 42 recognizes the fixed area code and the variable area code of the 2D code contained in an image captured by the camera 2 to designate a command corresponding to the recognized codes, and then allows the game processor 31 to execute the command.

FIG. 5 illustrates an example of the configuration of a code table 61 stored in the code table storage portion 55 shown in FIG. 4.

In FIG. 5, the code table 61 is table information for associating the fixed area code with the variable area code default value and the command table. For example, if "AAA" is supplied from the variable area code default value setting portion 54 as the fixed area code, the code table storage portion 55 refers to the code table 61 to return the "pattern A" as the variable area code default value and the "pattern A-1" as the command table based on the information of the second row of the code table 61 in FIG. 5 to the variable area code default value setting portion 54.

The "pattern A" as the variable area code default value may be the cell pattern itself representing the default value of the variable area 13, or alternative information concerning a numeric value equivalent to the cell pattern. Alternatively, the variable area code default value setting portion 54 may have a plurality of cell patterns, in which case, the "pattern A" may be identification information for specifying a cell pattern used as the variable area code default value selected from the plurality of cell patterns.

The information "pattern A-1" indicating the command table may be identification information for specifying one command table from a plurality of command tables stored in the command table storage portion 59. Alternatively, the "pattern A-1" may be a command table itself, in which case, the command table storage portion 59 can be omitted.

FIGS. 6A and 6B illustrate examples of the configuration of a command table stored in the command table storage portion 59 shown in FIG. 4.

In FIG. 6A, a command table 62 includes the command identification information, the difference value, and the command. The command identification information is information unique to each table. In the command table 62 in FIG. 6A, the "pattern A-1" is the command table identification information. The command table 62 is a table for associating the difference value (the difference between the recognized cell pattern and the default cell pattern) with the command. That is, the command table 62 is used for specifying the command corresponding to the concealed cell in the variable area 13.

For example, when the difference value is 0, i.e., when the recognized cell pattern is the default value since no cell is concealed, a "character A display" command to display the CG image of character A in a game on the monitor 3 is selected as the execution command. When the difference value is 1, an "attack" command to allow character A in a game to attack an opponent is selected as the execution command. When the difference value is 2, a "defense" command to allow character A in a game to defend himself/herself against an opponent's attack is selected as the execution command. When the difference value is 3, an "escape" command to allow character A in a game to escape from an opponent's attack is selected as the execution command. When the difference value is 4, an "item use" command to allow character A in a game to use an item is selected as the execution command. In this manner, the command table storage portion 59 instructs the command designation portion 58 to execute the command associated with the difference value supplied from the command designation portion 58.

FIG. 6B illustrates another example of the command table. The command table identification information assigned to a command table 63 is the "pattern B-3". In the command table 63, commands different from those in the command table 62 are assigned to the difference values. For example, when the difference value is 0, a "character B display" command to display the CG image of character B in a game on the monitor 3 is selected as the execution command. When the difference value is 1, a "stand" command to allow character B displayed on the monitor 3 to stand is selected as the execution command. When the difference value is 2, a "sit" command to allow character B displayed on the monitor 3 to sit is selected as the execution command. When the difference value is 3, a "turn right" command to allow character B displayed on the monitor 3 to turn right is selected as the execution command. When the difference value is 4, a "turn left" command to allow character B displayed on the monitor 3 to turn left is selected as the execution command.

As shown in FIGS. 6A and 6B, the command table storage portion 59 stores a plurality of command tables in which commands, which are different according to the command tables, are assigned to the corresponding difference values. The command table storage portion 59 selects a command table corresponding to the command table identification information supplied from the command designation portion 58, and then instructs the command designation portion 58 to execute the command corresponding to the difference value supplied from the command designation portion 58 by using the command table.

The processing executed by the information processing apparatus 1 configured as described above is discussed below. When the information processing apparatus 1 is powered on, the game processor 31 receives a user's instruction input from the input unit 34 and runs a video game program read from the removable medium 38 installed in the storage unit 35 or the drive 37 or a video game program obtained from an external source of the information processing apparatus 1 via the communication unit 36. Then, the information processing apparatus 1 starts game processing.

A description is given below, with reference to the flowchart in FIG. 7, of game processing in a video game played by the user by using the card 5 on which the 2D code is printed, i.e., game processing accompanying processing for recognizing the 2D code by using the camera 2.

After starting game processing, in step S1, the game processor 31 causes the code recognition unit 42 to start code recognition processing for reading the 2D code printed on the card 5 disposed in the range 4. Details of the code recognition processing are discussed below with reference to the flowchart in FIG. 8.

After starting the code recognition processing, in step S2, the game processor 31 determines whether a command designation instruction has been obtained from the code recognition unit 42 as a result of the code recognition processing. If the game processor 31 determines that a command designation instruction has been obtained, the process proceeds to step S3 in which the game processor 31 executes the command designated by the command designation instruction. More specifically, the game processor 31 turns ON the command designation flag based on the command designation instruction supplied from the code recognition unit 42, and executes the command at a predetermined time according to the schedule.

Then, in step S4, the game processor 31 generates an output CG image reflecting the command execution result and supplies it to the display controller 43. Upon receiving the output CG image, in step S5, the display controller 43 combines the output CG image with a captured image supplied from the camera 2 via the input interface 41 under the control of the game processor 31, and supplies the synthesized image to the output interface 44. Then, in step S6, the output interface 44 supplies the synthesized image to the monitor 3 under the control of the game processor 31, and the monitor 3 displays the synthesized image supplied from the output interface 44.

After step S6, the process proceeds to step S7. If it is determined in step S2 that a command designation instruction has not been obtained, the process proceeds to step S7 by omitting steps S3 through S6.

In step S7, the game processor 31 executes processing other than the code recognition processing. The game processor 31 then determines in step S8 whether the game is to be finished. If the game processor 31 determines that the game is not finished since the user is still playing the game, the process returns to step S2, and step S2 and the subsequent steps are repeated. If the game processor 31 determines in step S8 that the game is to be finished in response to a user's instruction, the process proceeds to step S9. In step S9, the game processor 31 controls the code recognition unit 42 to finish the code recognition processing, and the game processing is then completed.

Figure 7:
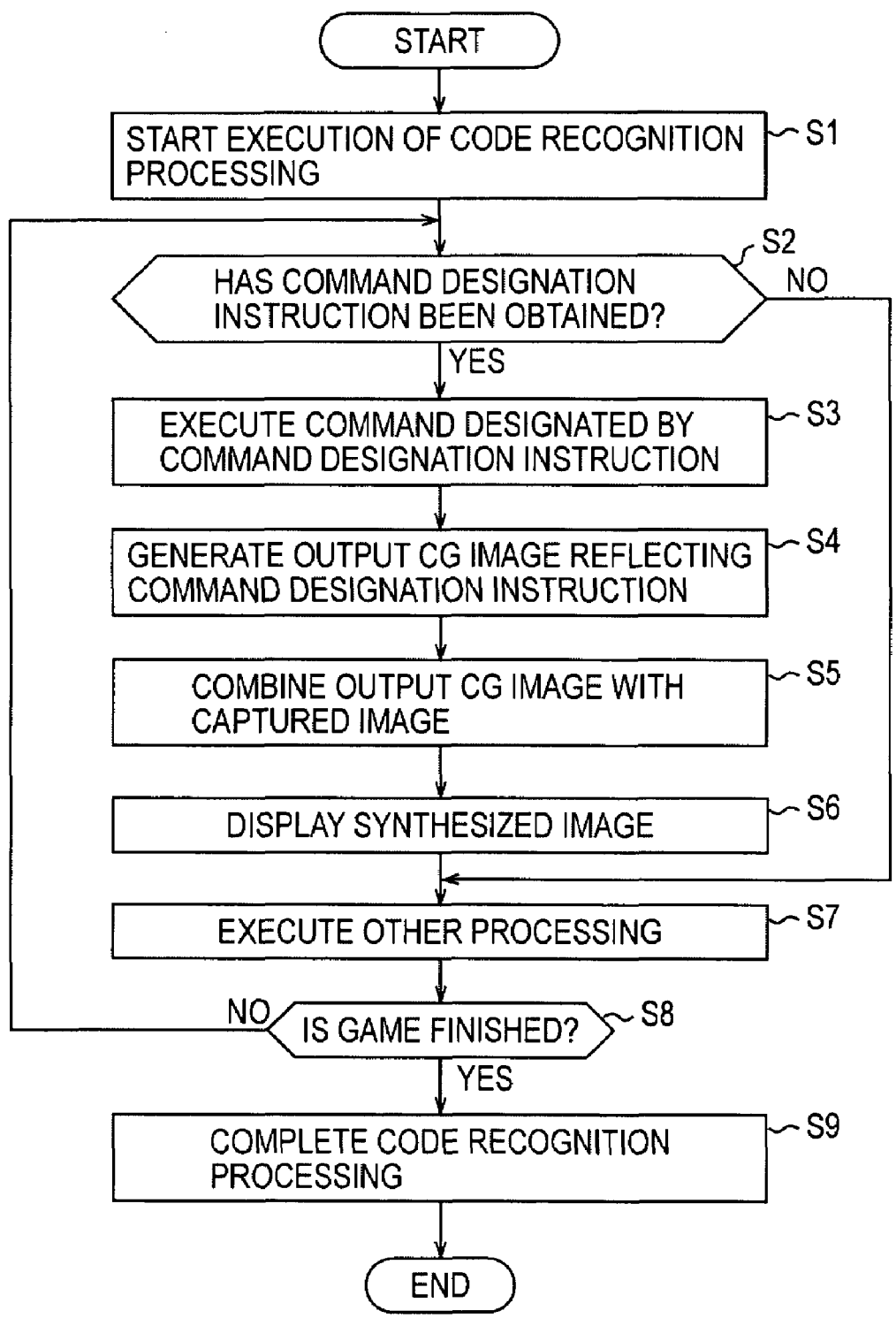
FIG. 7 is a flowchart illustrating game processing.

Details of the code recognition processing started in step S1 in FIG. 7 are discussed below with reference to the flowchart in FIG. 8.

When the code recognition processing is started, in step S21, the image data acquisition portion 50 acquires image data of a captured image from the camera 2 via the input interface 41.

In step S22, the guide portion recognition portion 51 performs the guide portion recognition processing, and more specifically, the guide portion recognition portion 51 analyzes the captured image to recognize the guide portion 11 of the 2D code (2D code of the card image 6 contained in the captured image) printed on the card 5 disposed in the range 4. The guide portion recognition portion 51 then constructs a three-dimensional coordinate system based on the recognized guide portion 11.

In step S23, the guide portion recognition portion 51 determines whether the guide portion of the 2D code has been recognized. If it is determined in step S23 that the guide portion has not been recognized since, for example, the card 5 is not disposed in the range 4 (since the card image 6 does not exist in the captured image), the process returns to step S21, and step S21 is executed on the subsequent frame image (captured image).

If it is determined in step S23 that the guide portion of the 2D code has been recognized, the process proceeds to step S24 in which the coordinate transformer 52 conducts coordinate transform on the captured image according to the three-dimensional coordinate system.

Then, in step S25, the fixed area code recognition portion 53 analyzes the captured image data based on the three-dimensional coordinate system to specify the position of the fixed area 12 relative to the position of the guide portion 11. The fixed area code recognition portion 53 then performs code recognition processing to analyze the 7×7-block cell pattern and recognizes the fixed area code. Then, the fixed area code recognition portion 53 determines in step S26 whether the fixed area code has been recognized. If it is determined in step S26 that part of or the entirety of the fixed area 11 is not contained in the captured image obtained by the camera 2 since it is hidden behind an obstacle (i.e., the fixed area 11 was not captured by the camera 2), the process returns to step S21, and step S21 is repeated on the subsequent frame image.

If it is determined in step S26 that the fixed area code has been recognized, the process proceeds to step S27.

In step S27, the variable area code default value setting portion 54 reads the default value of the variable area code corresponding to the recognized fixed area code from the code table storage portion 55, and sets the read value as the variable area code default value.

Then, in step S28, the variable area code recognition portion 56 performs code recognition processing on the variable area 13 of the captured image to specify the position of the variable area 13 from the captured image on the basis of the three-dimensional coordinate system and recognizes the variable area code contained in the variable area 13.

In step S29, the pattern comparator 57 compares the recognition result of the variable area code with the default value of the variable area code to determine the difference value. The command designation portion 58 then determines in step S30 based on the comparison result whether the recognition result is different from the default value of the variable area code (whether part of or the entirety of the variable area code is concealed). If the recognition result is found to be different from the default value in step S30, the process proceeds to step S31. In step S31, the command designation portion 58 obtains information concerning the command corresponding to the difference value from the command table storage portion 59 (supplies the command designation instruction to the game processor 31), and turns ON the command designation flag to instruct the execution of the command. The process then proceeds to step S33.

If it is determined in step S30 that the recognition result of the variable area code coincides with the default value (i.e., the default value is recognized), the process proceeds to step S32 in which the command designation portion 58 obtains information concerning the command corresponding to the default value from the command table storage portion 59 (supplies a command designation instruction to the game processor 31), and turns ON the command designation flag to instruct the execution of the command. The process then proceeds to step S33.

In step S33, the command designation portion 58 determines whether the code recognition processing is to be finished. If the code recognition processing is not finished, the process returns to step S21, and step S21 is executed on the subsequent frame image. In this code recognition processing, steps S21 through S33 are repeatedly executed simultaneously with the game processing shown in FIG. 7 while the game is being played.

If it is determined in step S33 that the code recognition processing is to be finished in response to a user's instruction to finish the game, the command designation portion 58 completes the code recognition processing. In this case, the game processing indicated by the flowchart in FIG. 7 is completed together.

That is, the code recognition unit 42 performs the above-described code recognition processing, and supplies an instruction to execute the command corresponding to the recognized code to the game processor 31. The game processor 31 then executes the command in response to the instruction to perform game processing.

In accordance with the operations of the individual elements of the information processing apparatus 1, various processing jobs are executed based on the 2D code printed on the card 5 disposed in the range 4 by the user. That is, by disposing the card 5 in the range 4, the user can input an instruction to control the processing executed by the information processing apparatus 1. For example, by disposing the card 5 in the range 4 and by suitably concealing the variable area code of the variable area 13, the user can input various instructions to a video game, which is being played by the user (provided by the information processing apparatus 1).

As shown in FIG. 9, a character assigned to the fixed area code of the fixed area 12 is different from a character assigned to another fixed area code of the fixed area 12, and a character corresponding to the fixed area code is displayed on the card image 6. For example, if the fixed area code is a cell pattern indicated by AAA, as shown at the top portion of FIG. 9, a character 71 is displayed on a card image 6-1, and if the fixed area code is a cell pattern indicated by BBB, as shown at the bottom portion of FIG. 9, a character 72 different from the character 71 is displayed on a card image 6-2.

In this manner, by changing the fixed area code (i.e., by changing the card 5), the user can change the character displayed on the card image 6.

As shown in FIG. 10, different game commands are assigned to the variable area codes of the variable area 13 according to the difference values with respect to the default value, and by concealing part of or the entirety of the variable area code, a command is executed in accordance with the concealed pattern. It is now assumed, for example, that the default value of the variable area code of the variable area 13 is formed of four cells (black squares), i.e., cells 81 through 84, as shown in FIG. 10. In this case, if the user conceals the cell 81, as indicated at the top portion of FIG. 10 (i.e., if the cells 82 through 84 are recognized without recognizing the cell 81), the concealed cell 81 becomes the difference value A-1, and the command A-1 corresponding to the difference value A-1 is executed.

If the user conceals the cell 82 (only the cells 81, 83, and 84 are recognized without recognizing the cell 82), as indicated at the bottom portion of FIG. 10, the concealed cell 82 becomes the difference value A-2, and the command A-2 corresponding to the difference value A-2 is executed.

That is, by concealing part of or the entirety of the variable area code of the variable area 13, a command is executed in accordance with the concealed pattern. Examples of instruction input operations using the variable area code are shown in FIGS. 11A, 11B, and 11C.

Figure 11A:
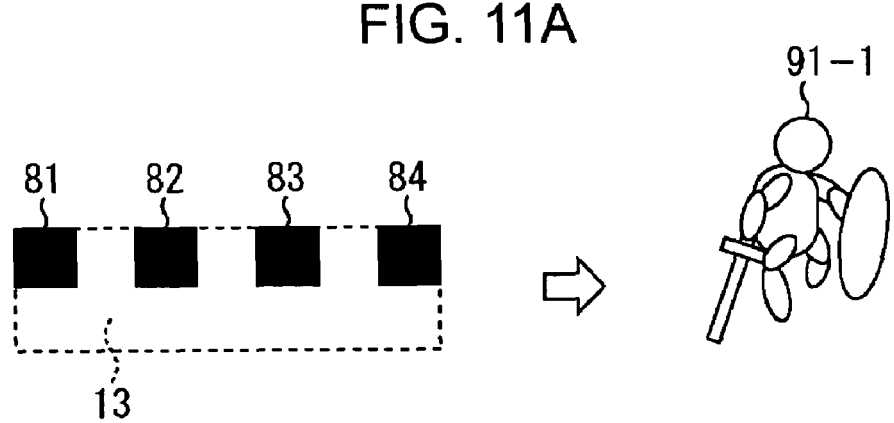
FIGS. 11A, 11B, and 11C illustrate instruction input operations using a variable area code.
Figure 11B:
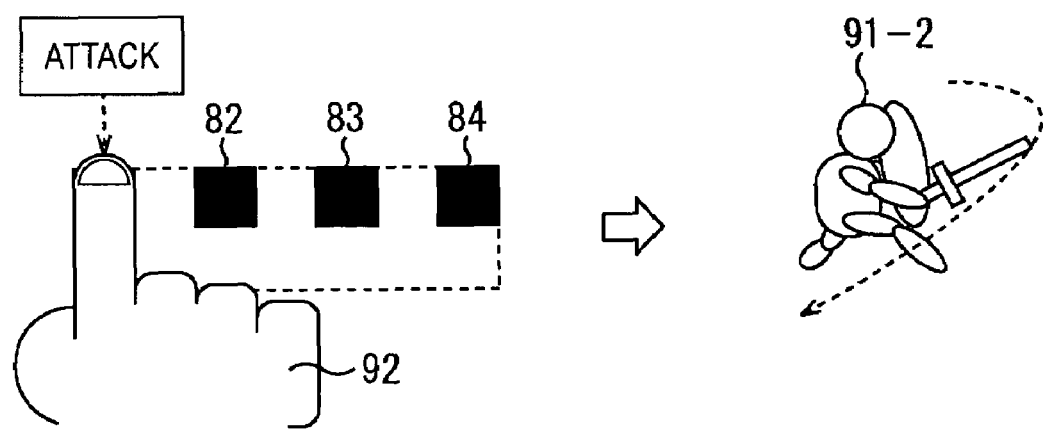
Figure 11C:
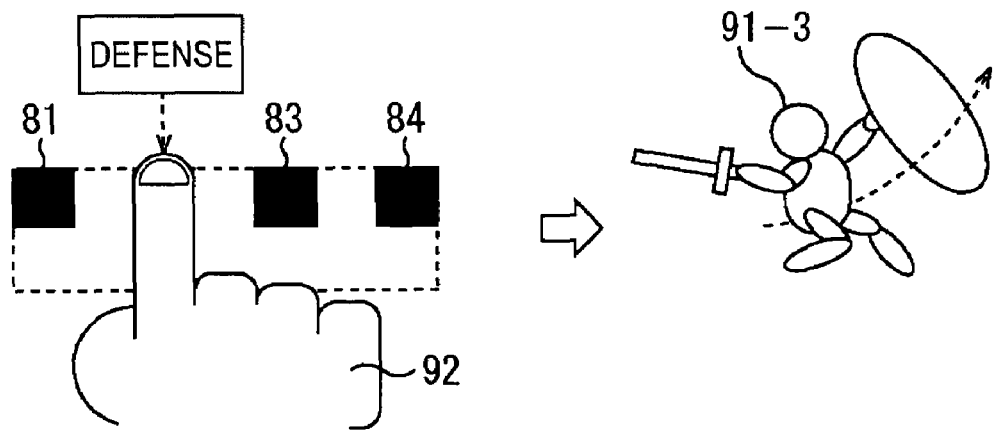

If, for example, the user conceals none of the cells 81 through 84, as shown in FIG. 11A, i.e., when the recognition result coincides with the variable area code default value, a character 91-1, which does not move, is displayed on the card image 6. If the user conceals the cell 81 with a hand 92, as shown in FIG. 11B, a character 91-2, which performs an attack action by brandishing a sword, is displayed on the card image 6 since an "attack" command is assigned to the difference value by the command table. If the user conceals the cell 82 with the hand 92, as shown in FIG. 11C, a character 91-3, which defends himself/herself by raising a shield, is displayed on the card image 6 since a "defense" command is assigned to the difference value by the command table.

In known art, only a fixed 2D code corresponding to the fixed area 12 is printed on the card 5. Accordingly, when the user wishes to input a plurality of instructions into the information processing apparatus 1, the replacement of cards is necessary every time the user inputs an instruction to allow the information processing apparatus 1 to recognize the 2D code corresponding to the instruction. In the embodiment of the present invention, however, the user can input various instructions into the information processing apparatus 1 (information processing system including the information processing apparatus 1, the camera 2, and the monitor 3) by concealing the variable area code in various manners without the need to replace the card 5 with another one.

Since, as described above, the input information is changed depending on a portion concealed by the user, it is not necessary to change the cell pattern itself of the 2D code. That is, the 2D code may be a design printed (drawn) on the card 5, and it is not necessary that the card 5 has a display unit, such as a monitor, and the 2D code is displayed on the display unit. However, the 2D code can be changed by using a display unit, which allows the user to input a plurality of types of information into the information processing apparatus 1 without the need to replace the card 5 with another one. In this case, however, the configuration of the card 5 becomes complicated by the provision of, for example, a CPU and a monitor, resulting in an increased manufacturing cost or operating cost. In contrast, in the embodiment of the present invention, the card 5 may be any type as long as the cell pattern of a 2D code is printed (or drawn) on the card 5. Accordingly, the card 5 can be configured simply without an electrical configuration or a mechanical configuration so that the card 5 can be created inexpensively by using a material, such as paper or plastic. The operating cost of the card 5 can also be reduced since an electrical configuration or a mechanical configuration is not necessary.

Additionally, the 2D code of the card 5 includes both the fixed area 12 and the variable area 13. More specifically, the user specifies a character to be displayed by the fixed area code, as shown in FIG. 9, and designates a command corresponding to the character by the variable area code, as shown in FIGS. 10 through 11C. In this manner, the 2D code of the card 5 has a plurality of (hierarchical) items of information (instructions) as a whole, and the user can input the hierarchical plurality of items of information (instructions) into the information processing apparatus 1 (information processing system) at one time by providing the 2D code.

As described above, the card 5 serves as a user interface which can be created and operated inexpensively and which allows a user to easily input various operational instructions. In other words, the information processing apparatus 1 (information processing system) can read the 2D code of the card 5 so that it can provide a user interface which can be manufactured and operated in expensively and which allows the user to easily input various operational instructions to the user.

Figure 12A:
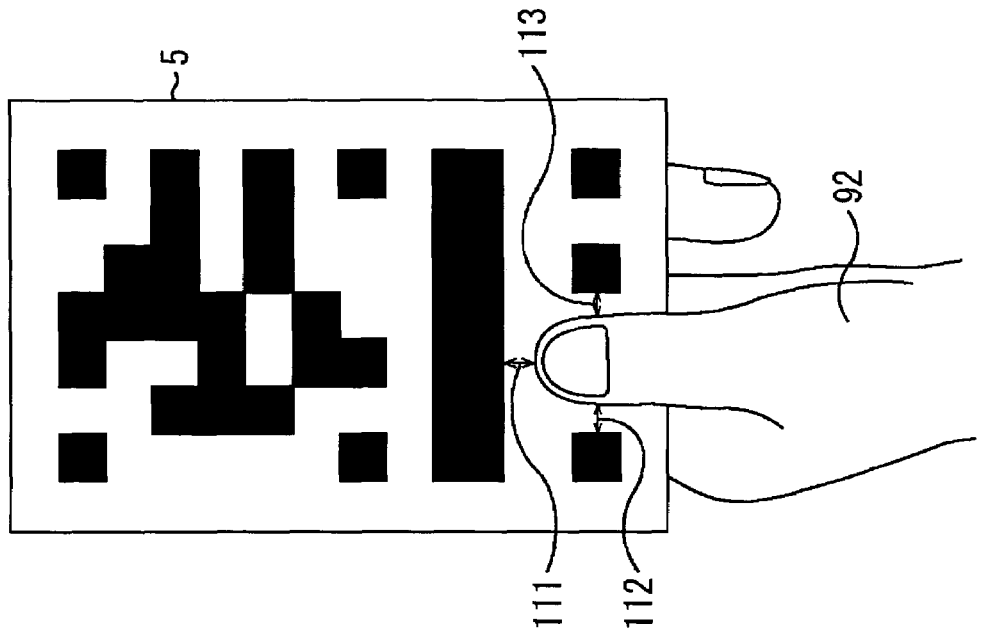
FIGS. 12A and 12B illustrate an example of a cell pattern in a variable area.
Figure 12B:
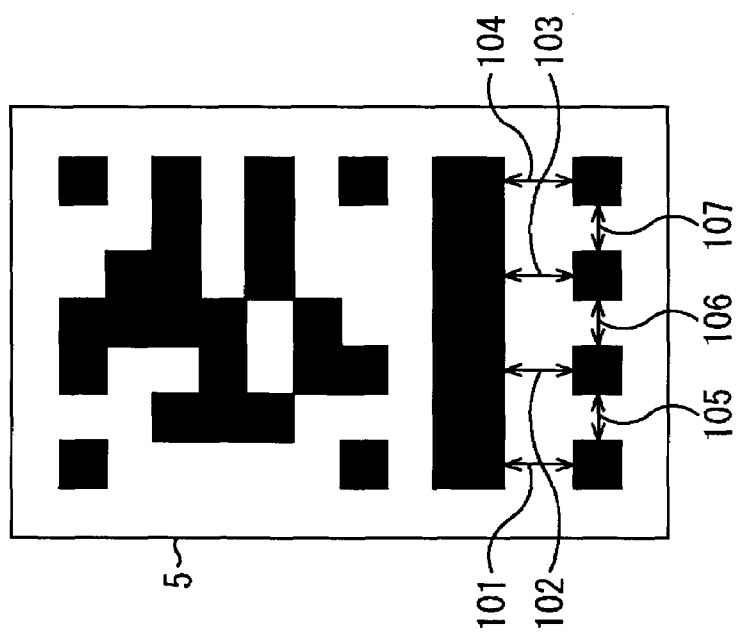

The cell pattern of the variable area code of the card 5 is partially or entirely concealed by the user with, for example, a finger. Accordingly, it is preferable that the cell patterns, which are the minimum units to be concealed, are disposed separately from each other at sufficient intervals so that the user can conceal the cells accurately. For example, if the variable area code of the variable area 13 is formed of four cells, as shown in FIG. 12A, and if the minimum unit to be concealed by the user is one cell, a difference with respect to the default value is determined by concealing one cell of the variable area 13 by the user to input a new command. In this case, it is necessary that the four cells be positioned sufficiently away from the guide portion 11, as indicated by arrows 101 through 104 in FIG. 12A, and also that the individual cells be positioned separately from each other at sufficient intervals, as indicated by arrows 105 through 107. With this arrangement, even when the user conceals one cell with a thumb of the hand 92, as shown in FIG. 12B, there is still a space with the guide portion 11 and with the adjacent cells, as indicated by arrows 111 through 113, so that the erroneous reading of a concealed portion can be prevented.

That is, it is preferable that the individual cells, which are minimum units to be concealed, of the cell pattern in the variable area 13 of the card 5 be disposed separately from each other at sufficient intervals. With this arrangement, the recognition rate of the 2D code of the card 5 by the information processing apparatus 1 can be improved.

The cells of the variable area 13 may be formed in multiple colors. For example, the cells may be formed of black squares and white squares, as shown in FIG. 13A. In this case, if the user conceals a cell with the hand 92, as shown in FIG. 13B, the concealed portion may be recognized as a black color or a white color. In this manner, according to the 2D code pattern of the card 5 shown in FIGS. 13A and 13B, if the information processing apparatus 1 recognizes neither the black square nor the white square, it is determined that a cell is concealed. With this arrangement, the recognition rate of the 2D code of the card 5 by the information processing apparatus 1 can be enhanced.

Alternatively, the cell pattern of the variable area 13 of the card 5 may be formed as a complicated pattern, which is very different from a pattern, such as a finger, as shown in FIG. 14A. In this case, if the user conceals a cell pattern with the hand 92, as shown in FIG. 14B, the information processing apparatus 1 does not mistake the pattern of the finger for the pattern of the variable code since it is different from the other portions (unconcealed cells). That is, the recognition rate of the 2D code of the card 5 by the information processing apparatus 1 can be improved.

Figure 15A:
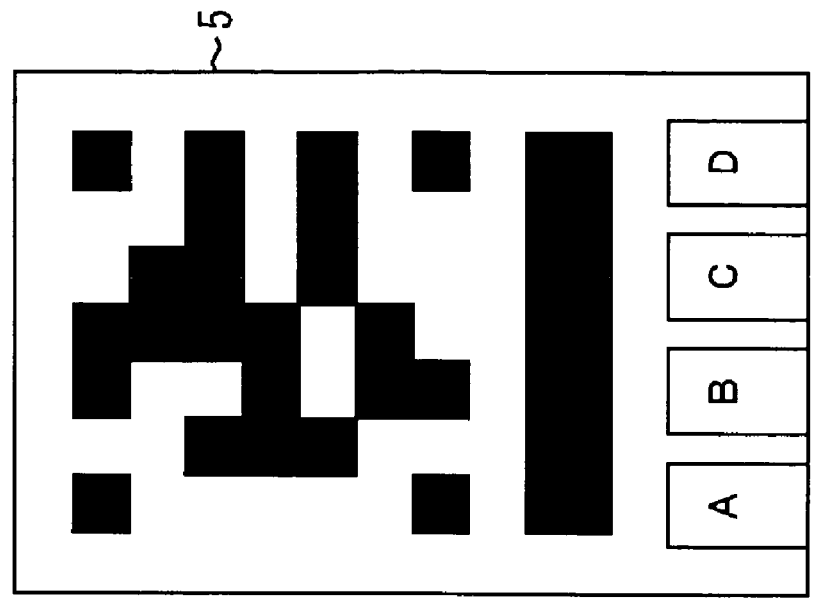
FIGS. 15A and 15B illustrate other examples of cell patterns in a variable area.
Figure 15B:
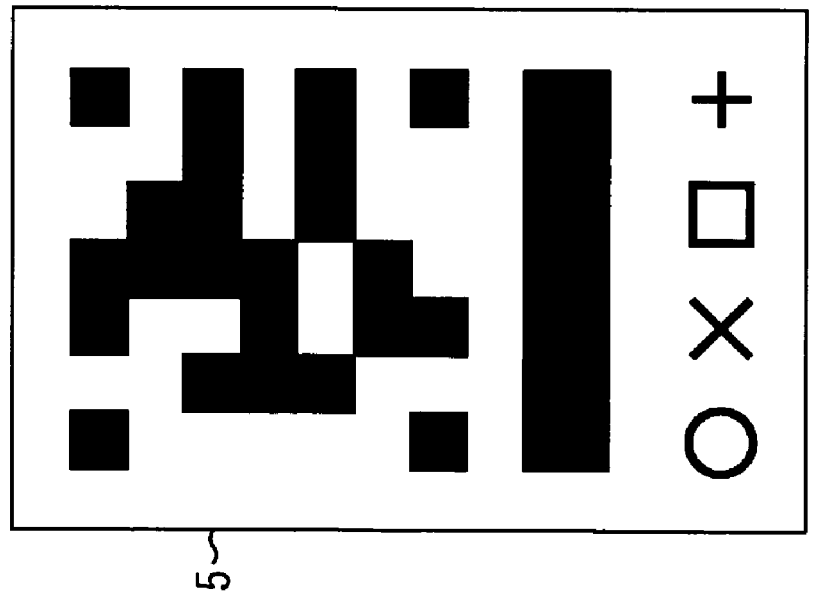

The variable area code (cells) of the variable area 13 may be any pattern, for example, signs, such as those shown in FIG. 15A, or letters, such as those shown in FIG. 15B. The cells may be patterns (signs or letters), as shown in FIGS. 15A and 15B, different from each other. A combination of signs, letters, and figures may be used as cells in the variable area 13.

In the above-described example, the input of information (instructions) is controlled by concealing the variable area code. That is, the entire variable area code in the variable area 13 is set as the default value of the variable area code, and by concealing part of or the entirety of the variable area code, the variable area code value is changed. However, the variable area code value may be changed in a different manner. For example, the default value of the variable area code is set to be 0 (no cell is disposed), as shown in FIG. 16A, and the input of information may be controlled by adding a predetermined sign to the variable area 13. That is, the state in which no cell is disposed in the variable area 13 is set as the default value, and a new code added to the variable area 13 is set to be a variable area code. In this manner, the addition of a new code may change the variable area code value.

In FIG. 16A, the default value of the variable area code is set to be 0 (no cell is disposed) in the variable area 13 of the 2D code of the card 5. If the user adds a small card 151 or 152 with a predetermined sign to the variable area 13, as shown in FIG. 16B, the information processing apparatus 1 identifies information (instruction) to be input by the type or the position of the sign.

Figure 8:
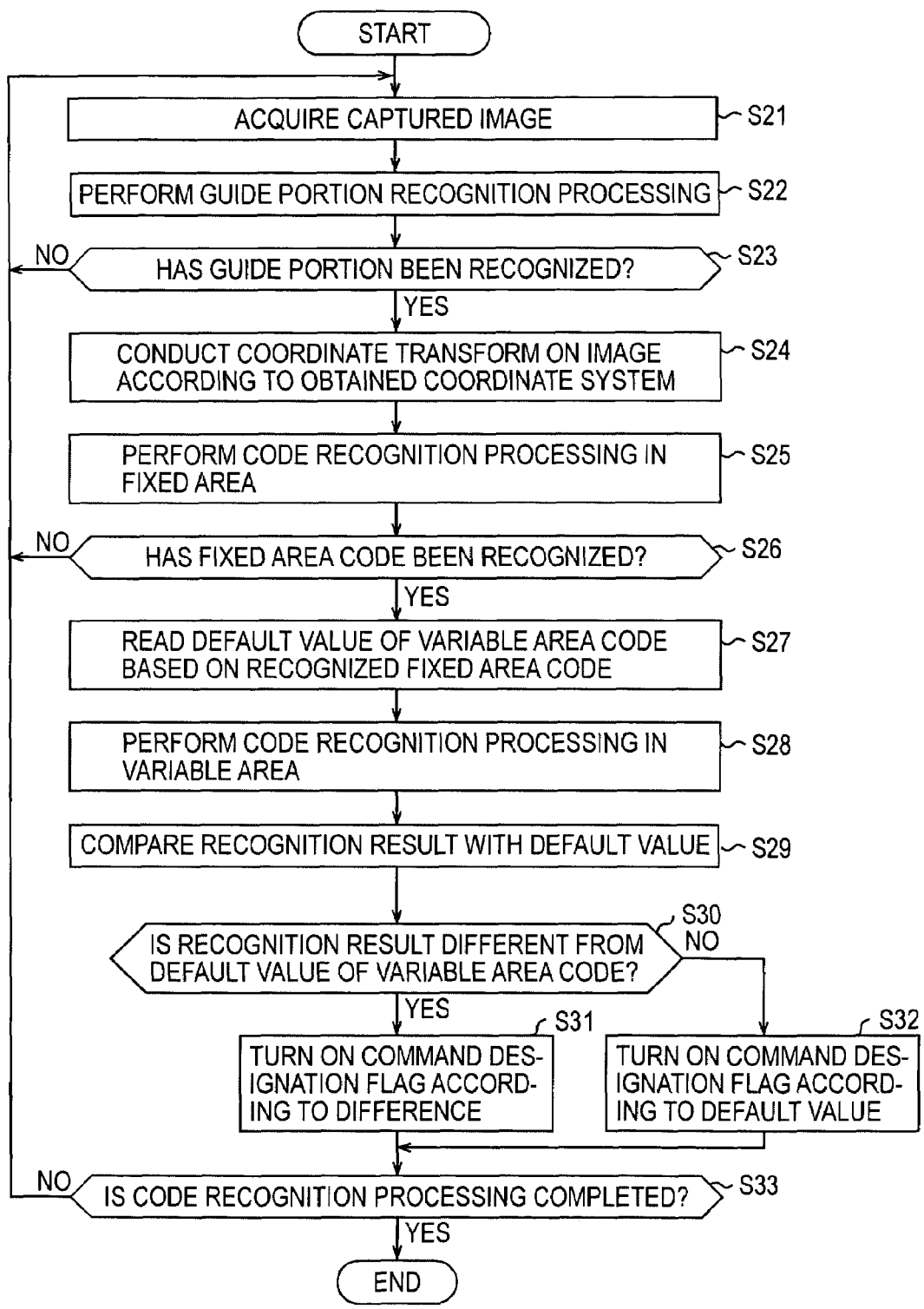
FIG. 8 is a flowchart illustrating an example of code recognition processing.

If a new code is added, the variable area code recognition portion 56 of the code recognition unit 42 of the information processing apparatus 1 determines in step S30 of the code recognition processing shown in FIG. 8 whether predetermined image information (for example, figures, signs, or letters) is added to the variable area code, instead of determining whether part of or the entirety of the variable area code is concealed.

Concealing the variable area code and adding a new code may be used together. For example, a predetermined execution command may be assigned to a difference value determined as a result of concealing part of or the entirety of the variable area code or adding new image information.

The arrangement of the guide portion 11, the fixed area 12, and the variable area 13 of the 2D code of the card 5 may be other than that shown in FIG. 2.

Figure 17A:
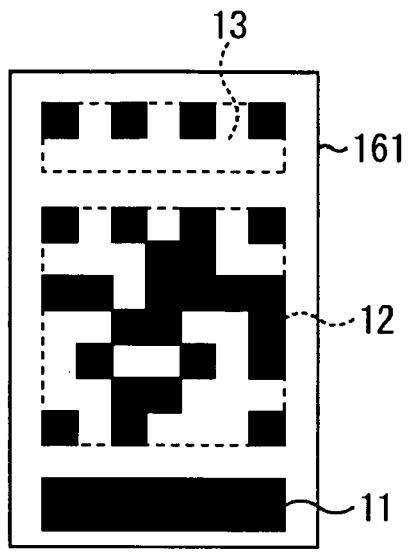
FIGS. 17A through 17D illustrate examples of the arrangements of a fixed area and a variable area in a 2D code.
Figure 17B:
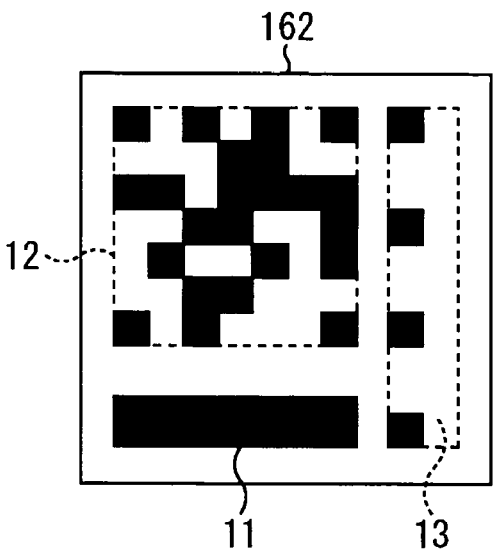
Figure 17C:
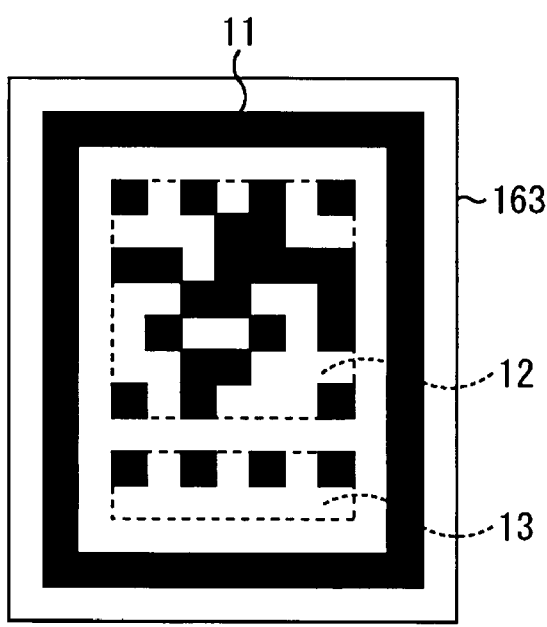

For example, as in a card 161 shown in FIG. 17A, the fixed area 12 and the variable area 13 may be disposed in parallel with the guide portion 11. Alternatively, as in a card 162 shown in FIG. 17B, the variable area 13 may be disposed horizontally next to the guide portion 11 and the fixed area 12. Or, as in a card 163 shown in FIG. 17C, the guide portion 11 may be disposed to surround the fixed area 12 and the variable area 13.

Figure 17D:
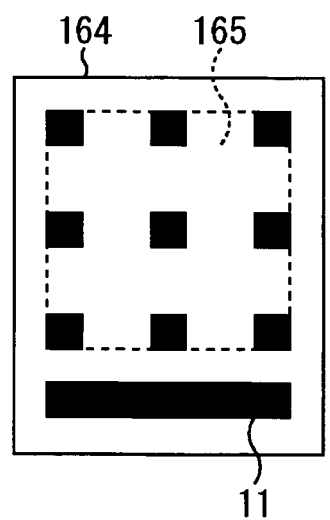

Alternatively, as in a card 164 shown in FIG. 17D, the fixed area 12 and the variable area 13 may be formed as one area (variable area 165). In this case, the code in the variable area 165 is recognized on the time axis. For example, the code in the variable area 165 is recognized as a fixed area code at a certain time, and is recognized as a variable area code at another time. At the time when the code of the variable area 165 is recognized as the fixed area code, the user sets the fixed area code as the default value without concealing cells in the variable area 165. At the time when the code of the variable area 165 is recognized as the variable area code, the user conceals part of or the entirety of the cells in the variable area 165 to change the cell to be recognized.

The 2D code of the card 5 may be formed of the guide portion 11 and the variable area 13 by omitting the fixed area 12, or may be formed of only the variable area 13 by omitting the guide portion 11 and the fixed area 12.

Figure 18:
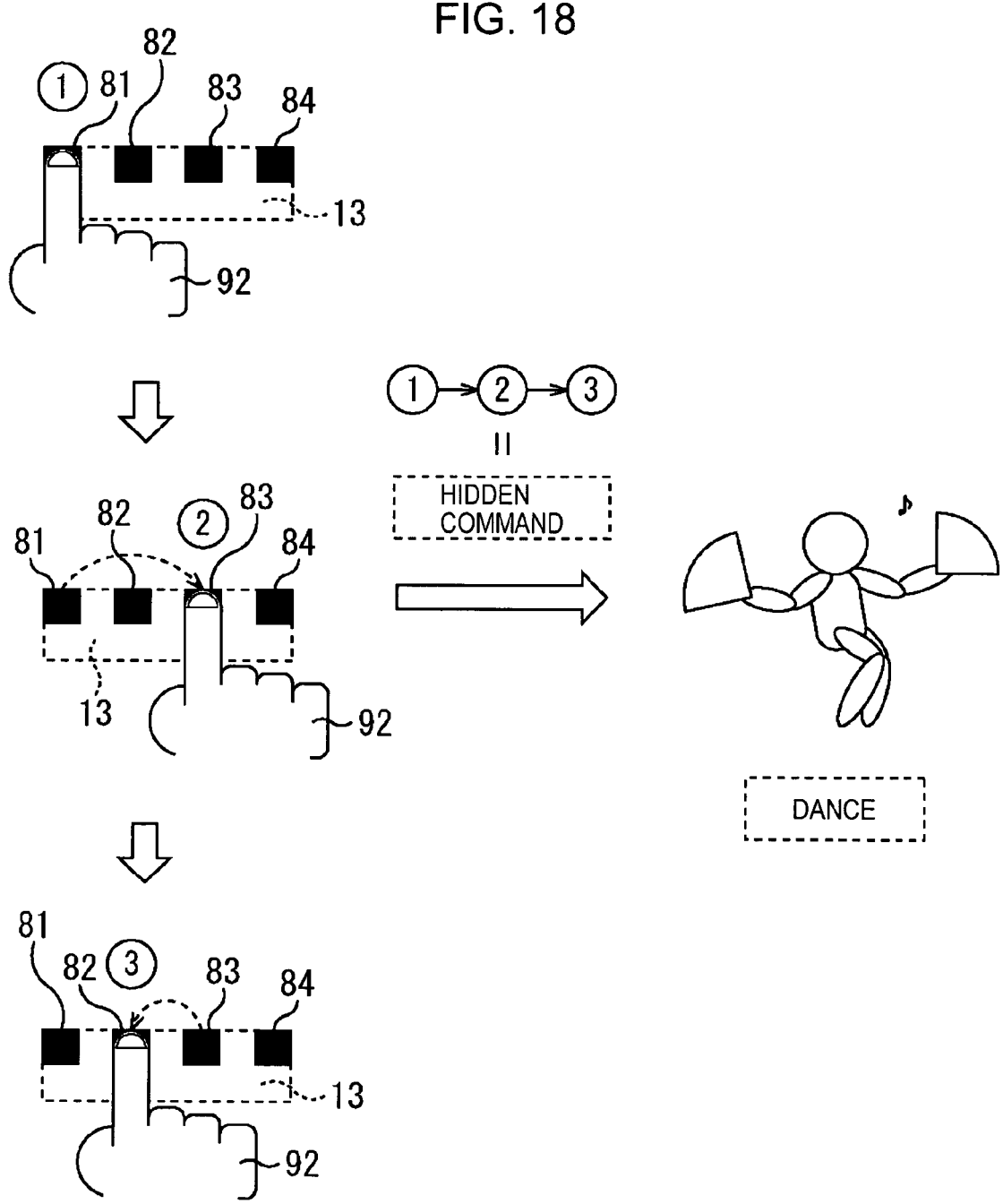
FIG. 18 illustrates another example of a variable area code.

The pattern (order) of concealing the cells by the user may be associated with an execution command, as shown in FIG. 18. In the example shown in FIG. 18, the user first conceals the cell 81 of the variable area 13 with the hand 92 (No. 1), as indicated at the top left in FIG. 18, and then, conceals the cell 83 (No. 2), as indicated at the middle left in FIG. 18, and finally conceals the cell 82 (No. 3), as indicated at the bottom left in FIG. 18. A hidden command "dance" is assigned to this pattern of concealing the cells by the command table, and when the user conceals the cells in the above-described order, a CG image of a dancing character is displayed on the monitor 3.

Figure 19:
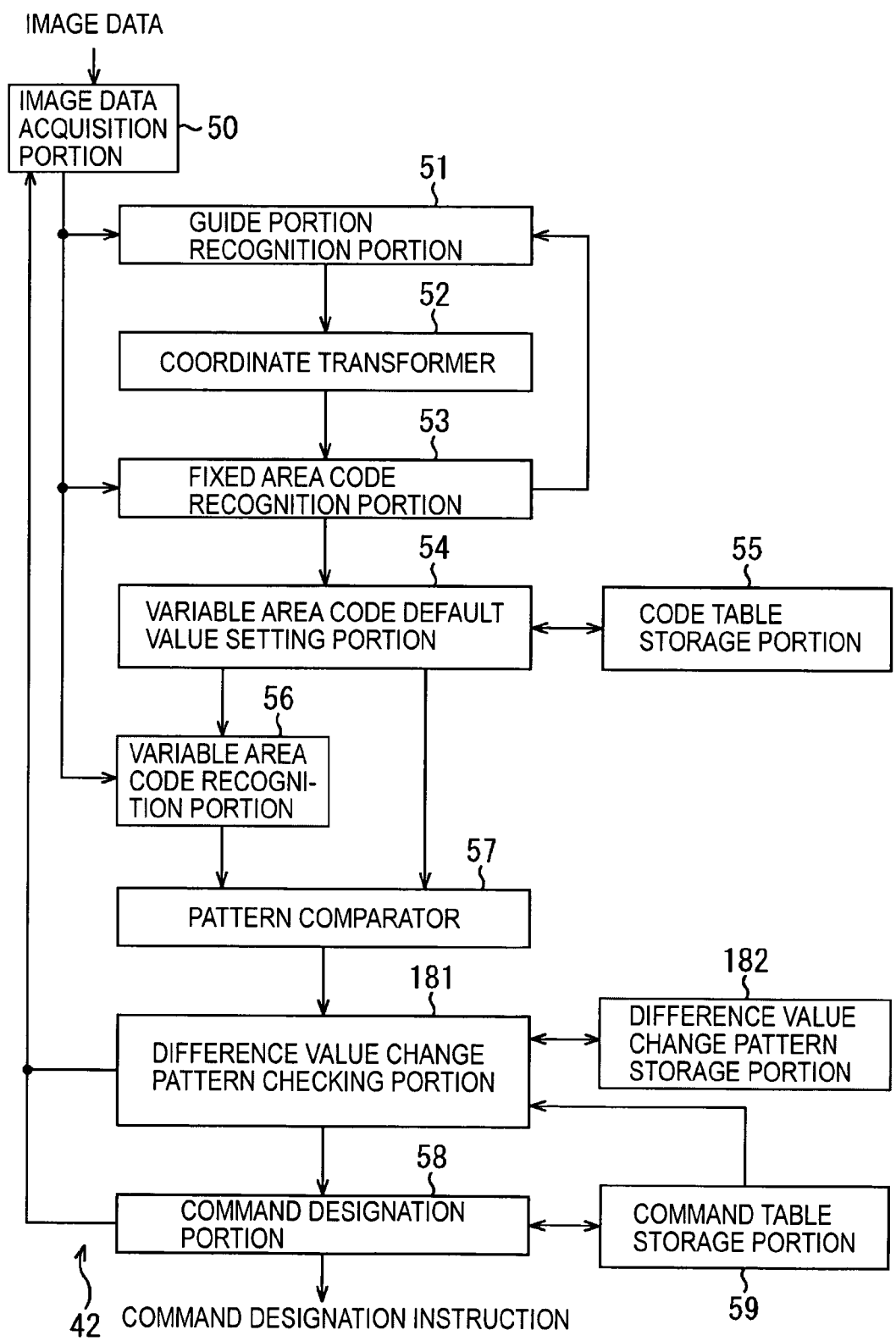
FIG. 19 is a block diagram illustrating another example of the configuration of the code recognition unit.

If the pattern (order) of concealing the variable area code (or adding new code) specifies an instruction to be input, as described above, the code recognition unit 42 of the information processing apparatus 1 is configured, as shown in FIG. 19. In FIG. 19, the code recognition unit 42 includes a difference value change pattern checking portion 181 and a difference value change pattern storage portion 182 in addition to the elements shown in FIG. 4.

The difference value change pattern checking portion 181 checks the pattern of changing the difference value (difference value change pattern) detected by the pattern comparator 57. Upon receiving a difference value, the difference value change pattern checking portion 181 supplies the difference value to the difference value change pattern storage portion 182, and the difference value change pattern storage portion 182 adds the difference value to a set of difference values stored as the difference value change pattern. The difference value change pattern checking portion 181 obtains the command table stored in the command table storage portion 59 and compares the difference value change pattern stored in the difference value change pattern storage portion 182 with the difference value change pattern registered in the command table to check whether the two difference value change patterns coincide with each other. The difference value change pattern checking portion 181 then supplies the check result to the command designation portion 58.

The command designation portion 58 specifies the command from the command table stored in the command table storage portion 59 based on the check result and causes the game processor 31 to execute the command.

FIG. 20 illustrates an example of the configuration of a command table 183 stored in the command table storage portion 59. The command table 183 includes command table identification information, a difference value change pattern, and a command. The command table 183 is identified by the command table identification information "pattern A-5", and a command "dance A" is assigned to the difference value change pattern in which the difference value changes in the order of 1→3→2. That is, if the user conceals the variable area code so that the difference value changes in the order of 1→3→2, an execution command "dance A" is input into the information processing apparatus 1.

The corresponding code recognition processing is discussed below with reference to the flowcharts in FIGS. 21 and 22.

Steps S51 through S59 performed by the corresponding elements of the code recognition unit 42 are similar to steps S21 through S29, respectively, and an explanation thereof is thus omitted.

Figure 21:
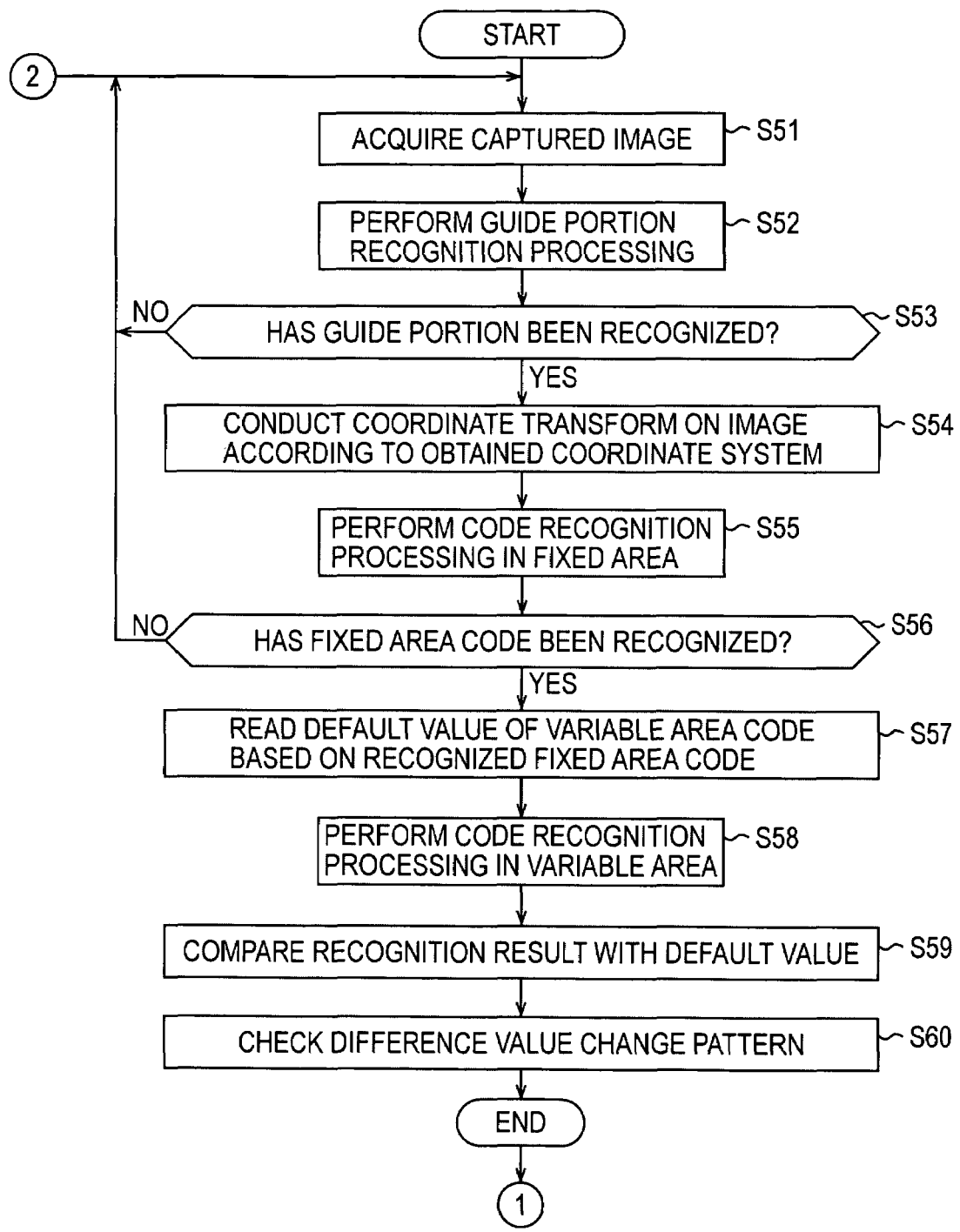
FIGS. 21 and 22 are flowcharts illustrating another example of the code recognition processing.

After the pattern comparator 57 compares the recognition result with the default value, in step S60 in FIG. 21, the difference value change pattern checking portion 181 checks the difference value change pattern by using the difference value change pattern storage portion 182.

Figure 22:
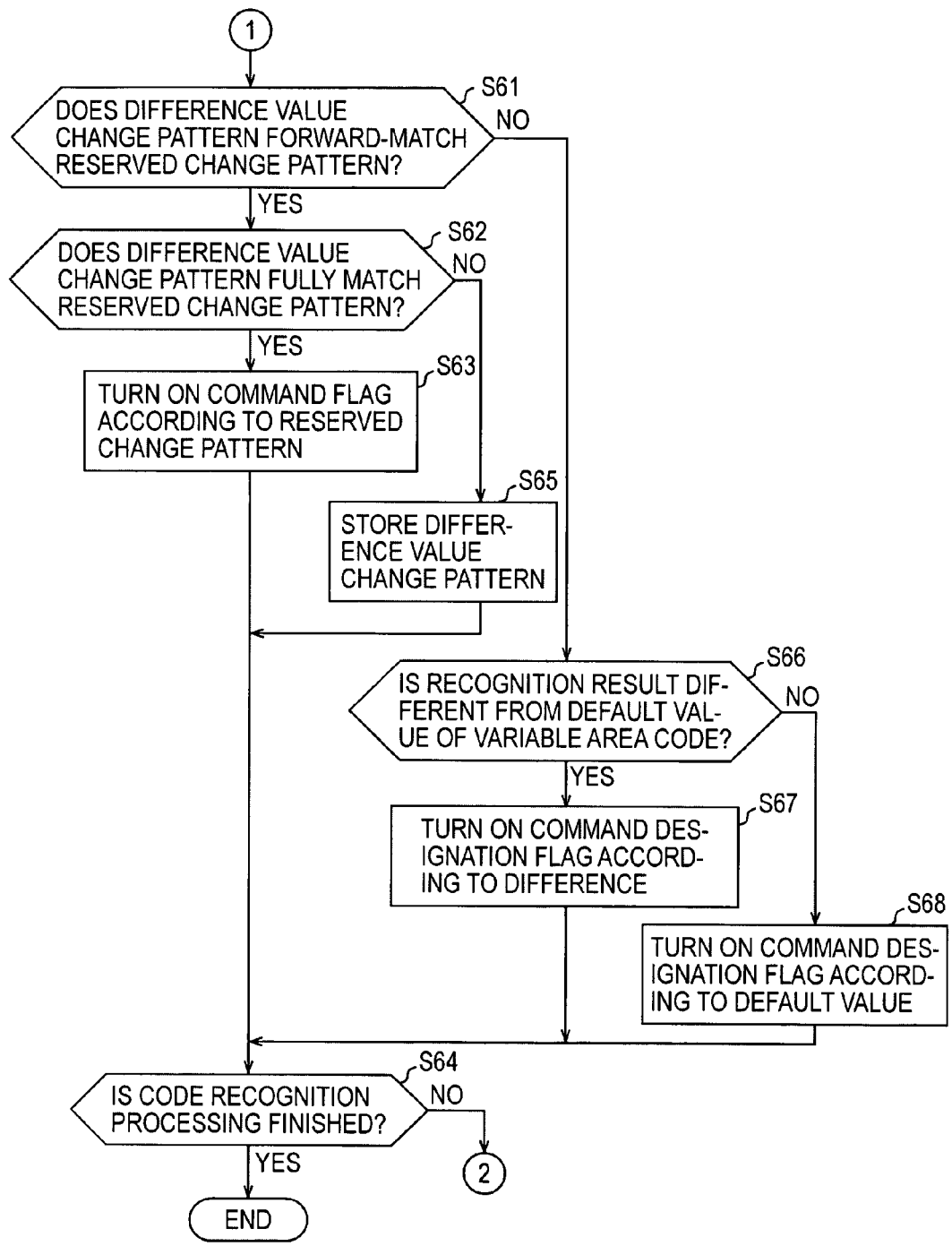

Then, in step S61 in FIG. 22, the difference value change pattern checking portion 181 determines whether the difference value change pattern forward-matches the reserved change pattern, which is the difference value change pattern registered in the code table. That is, the difference value change pattern checking portion 181 determines whether there is a possibility that the difference value change pattern stored in the difference value change pattern storage portion 182 fully matches the change pattern registered in the code table.

If it is determined in step S61 that the difference value change pattern forward-matches the reserved change pattern, the difference value change pattern checking portion 181 determines in step S62 whether the difference value change pattern fully matches the reserved change pattern. If it is determined in step S62 that the difference value change pattern fully matches the reserved change pattern, the process proceeds to step S63. In step S63, the command designation portion 58 specifies the command corresponding to the fully matched reserved change pattern based on the command table, and instructs the game processor 31 to turn ON the command designation flag to reserve the execution of the command.

After step S63, the command designation portion 58 determines in step S64 whether the code recognition processing is to be finished. If it is determined in step S64 that the code recognition processing is not finished, the process returns to step S51 in FIG. 21, and step S51 and the subsequent steps are repeated for the subsequent frame image.

If it is determined in step S64 that the code recognition processing is to be finished, the command designation portion 58 completes the code recognition processing.

If it is determined in step S62 that the difference value change pattern does not fully match the reserved change pattern although it forward-matches the reserved change pattern, i.e., that the difference value in the difference value change pattern does not match the difference value in the reserved change pattern, the process proceeds to step S65. In step S65, the difference value change pattern checking portion 181 supplies the difference value in the difference value change pattern to the difference value change pattern storage portion 182, and the difference value change pattern storage portion 182 adds the difference value to the difference value change pattern. After step S65, the process returns to step S64.

If it is determined in step S61 that the difference value change pattern does not forward-match the reserved change pattern, i.e., that there is no possibility that the difference value change pattern does not fully match the reserved change pattern since they are different from each other, the process proceeds to step S66.

The command designation portion 58 controls the command table storage portion 59 to perform steps S66 through S68 in a manner similar to steps S30 through S32, respectively, and an explanation of steps S66 through S68 is thus omitted. After step S67 or S68, the command designation portion 58 proceeds to step S64 to perform the above-described processing.

The above-described configuration allows the user to input a wider variety of operational instructions easily. In other words, the information processing apparatus 1 (information processing system) can provide a user interface which can be created and operated inexpensively and which allows a user to input a wider variety of operational instructions easily.

In the above-described examples, the card 5 serves as a user interface for video games. However, the user interface may be a remote controller for inputting an instruction to control the operations of a plurality of audiovisual (AV) machines.

Figure 23:
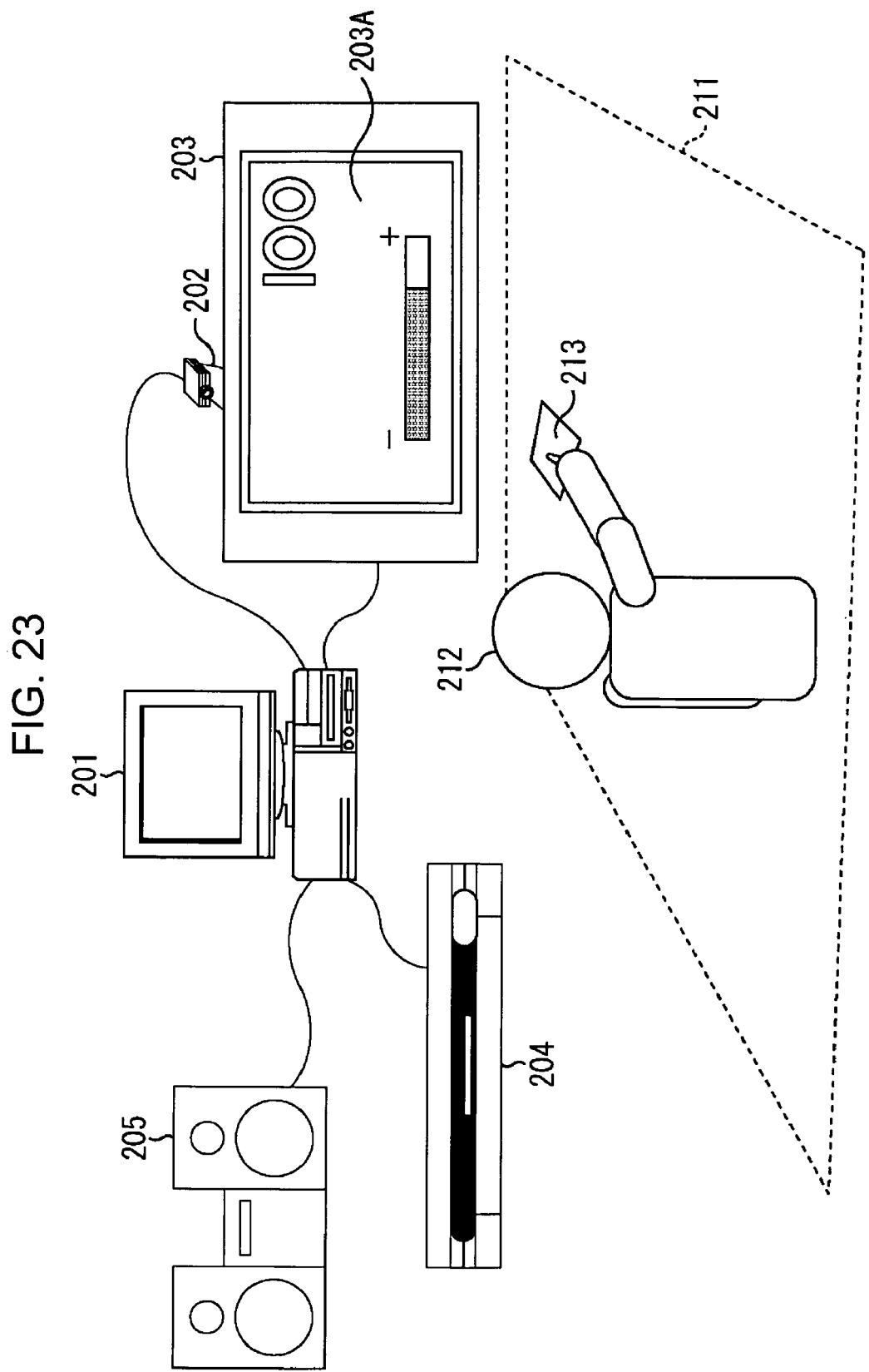
FIG. 23 illustrates another example of the configuration of an information processing system according to an embodiment of the present invention.

FIG. 23 illustrates an example of the configuration of an information processing system including a plurality of AV machines according to an embodiment of the present invention.

In FIG. 23, the information processing system includes an information processing apparatus 201, a camera 202, a television receiver 203, a hard disk recorder 204, and an audio component system (hereinafter referred to as the "audio component") 205.

The information processing apparatus 201 serves as a controller for centrally controlling the operations of the television receiver 203, the hard disk recorder 204, and the audio component 205. For example, the information processing apparatus 201 controls the television receiver 203 concerning the power ON/OFF operation, the broadcast channel to be received, the output sound settings (volume, tone, channel number, main-voice/sub-voice switching, etc.), and the screen settings (image size, luminance, hue, sharpness, noise reduction, horizontal/vertical synchronization, etc.). The information processing apparatus 201 controls the hard disk recorder 204 concerning the power ON/OFF operation, recording/playback processing, and the management of reservation information. The information processing apparatus 201 controls the audio component 205 concerning the power ON/OFF operation, recording/playback processing of CDs and MDs (registered), reservation processing, radio program reception, and the volume and tone of the output sound.

The information processing apparatus 201 also controls the camera 202 to capture an image to receive an instruction from a user 212 based on the above-described 2D code. The user 212 shows a card 213 to the camera 202 in a photographing range 211 of the camera 202. A 2D code similar to that of the card 5 is printed on the card 213. In this case, the fixed area code is formed by the code specifying the television receiver 203, the hard disk recorder 204, or the audio component 205, and the variable area code is formed by the code specifying control information to be input into the specified device.

The user 212 shows the 2D code of the card 213 to the camera 202. In this case, the user 212 selects the card 213 on which the fixed area code corresponding to the target device (the television receiver 203, the hard disk recorder 204, or the audio component 205) is printed, and shows the card 213 to the camera 202 while concealing part of or the entirety of the variable area code of the card 213 according to the instruction.

The information processing apparatus 201 analyzes the image captured by the camera 202 to specify the target device into which the instruction is to be input from the fixed area code of the 2D code, and also specifies the instruction in accordance with the concealed portion of the variable area code. The information processing apparatus 201 controls the operation of the television receiver 203, the hard disk recorder 204, or the audio component 205 in response to the specified information. In this case, the information processing apparatus 201 displays the type of instruction (for example, an image of the currently selected channel or the volume) on the screen of the television receiver 203 as a display image 203A. This allows the user 212 to input control information for the target device (remote-control the target device) while checking the instruction input by the user 212.

As described above, the user can use the card 213 on which the 2D code is printed as a remote controller for the television receiver 203, the hard disk recorder 204, and the audio component 205. That is, the card 213 is a battery-free user interface (remote controller) which can be created and operated inexpensively and which allows a user to input a wider variety of operational instructions easily.

Figure 24:
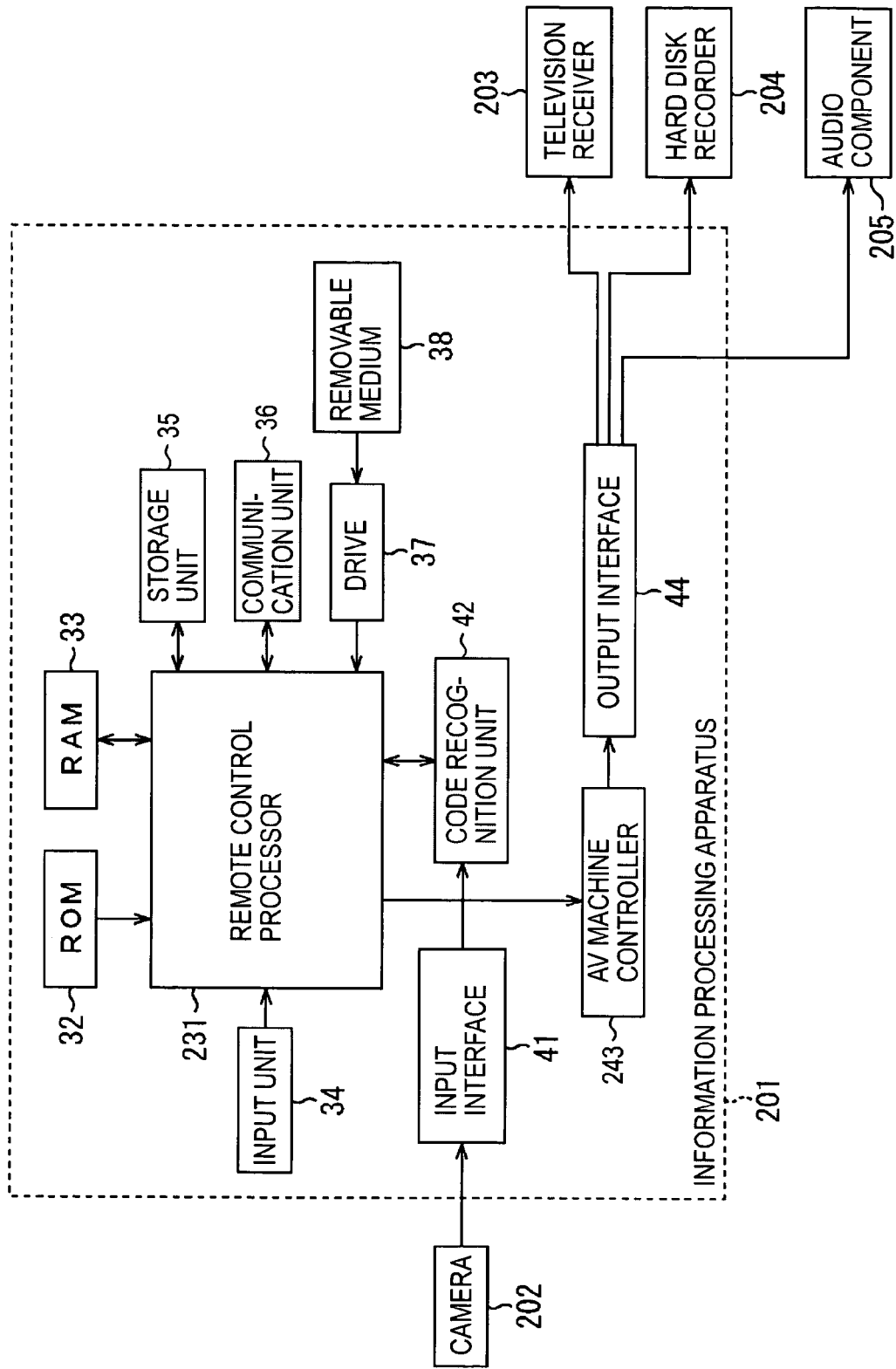
FIG. 24 is a block diagram illustrating an example of the internal configuration of an information processing apparatus shown in FIG. 23.

FIG. 24 is a block diagram illustrating the internal configuration of the information processing apparatus 201 shown in FIG. 23. The internal configuration of the information processing apparatus 201 shown in FIG. 24 is basically similar to that of the information processing apparatus 1 shown in FIG. 3. However, in contrast to the information processing apparatus 1 performing processing concerning video games, the information processing apparatus 201 performs processing for remote-controlling AV machines by the user 212 by using the card 213. Accordingly, the information processing apparatus 201 includes a remote control processor 231 instead of the game processor 31 in the information processing apparatus 1 and has an AV machine controller 243 instead of the display controller 43 in the information processing apparatus 1.

The remote control processor 231 receives from the user control information for the television receiver 203, the hard disk recorder 204, or the audio component 205, and performs processing for remote-controlling the target device based on the received information. In this case, as in the game processor 31, the remote control processor 231 controls the code recognition unit 42 to recognize the 2D code contained in the captured image. The remote control processor 231 also supplies the recognition result to the AV machine controller 243 and causes the AV machine controller 243 to supply the control information concerning the television receiver 203, the hard disk recorder 204, or the audio component 205 to the target device via the output interface 44.

Figure 25:
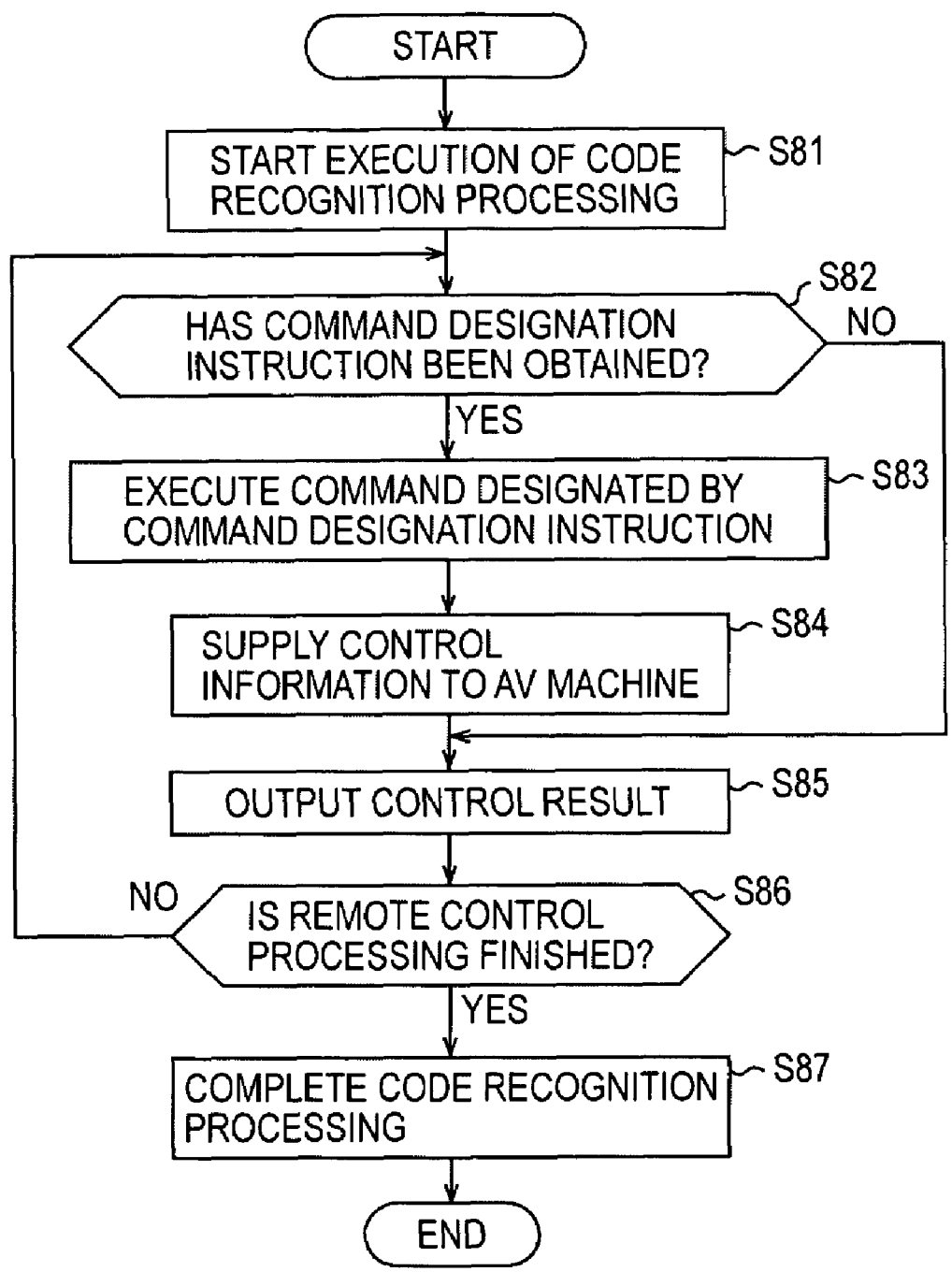
FIG. 25 is a flowchart illustrating remote control processing.

The remote control processing performed by the information processing apparatus 201 is described below with reference to the flowchart in FIG. 25. The remote control processing corresponds to the game processing performed by the information processing apparatus 1.

In step S81, the remote control processor 231 controls the code recognition unit 42 to start the execution of the code recognition processing. In response to this instruction, the code recognition unit 42 starts the code recognition processing described with reference to the flowchart in FIG. 8. When the user 212 shows the card 213 in the range 211 to the camera 202, the code recognition unit 42 analyzes the image captured by the camera 202 to recognize the 2D code of the card 213 and supplies a command designation instruction corresponding to the 2D code to the remote control processor 231.

In step S82, the remote control processor 231 determines whether the command designation instruction has been obtained from the code recognition unit 42. If it is determined in step S82 that the command designation instruction has been obtained, the process proceeds to step S83 in which the remote control processor 231 executes the command designated by the command designation instruction. More precisely, the remote control processor 231 turns ON a flag for reserving the execution of the command designated by the command designation instruction to execute the command at a predetermined (suitable) time according to the execution schedule. That is, it may take some time to execute the command corresponding to the command designation instruction after obtaining the command designation instruction from the remote control processor 231.

Then, in step S84, the AV machine controller 243 supplies the control information designated by the user 212 to the target AV machine via the output interface 44 under the control of the remote control processor 231 executed the command. In step S85, the AV machine controller 243 supplies the control result to the television receiver 203 via the output interface 44 and causes the television receiver 203 to output (display) the control result.

After step S85, the process proceeds to step S86. If it is determined in step S82 that a command designation instruction has not been obtained, the process also proceeds to step S86 by skipping steps S83 through S85.

In step S86, the remote control processor 231 determines whether the remote control processing is to be finished. If it is determined in step S86 that the remote control processing is not finished, the process returns to step S82, and step S82 and the subsequent steps are repeated. If it is determined in step S86 that the remote control processing is to be finished, the remote control processor 231 proceeds to step S87 to control the code recognition unit 42 to finish the code recognition processing. The remote control processing is then completed.

As described above, the card 213 serves as a remote controller (user interface) which can be created and operated inexpensively and which allows a user to input a wider variety of operational instructions easily. In other words, the information processing apparatus 201 (information processing system) can read the 2D code on the card 213 to perform control processing for the AV machine in accordance with the read code. It is thus possible to provide a remote controller (user interface) which can be created and operated inexpensively and which allows a user to input a wider variety of operational instructions easily.

In the above-described examples, the control operation using a two-dimensional barcode has been discussed. However, the user interface is not restricted to a card on which a two-dimensional barcode is printed (drawn). Instead, the user interface may be implemented by using any type of information as long as such information is recognizable from an image captured by a camera as image information.

Figure 26:
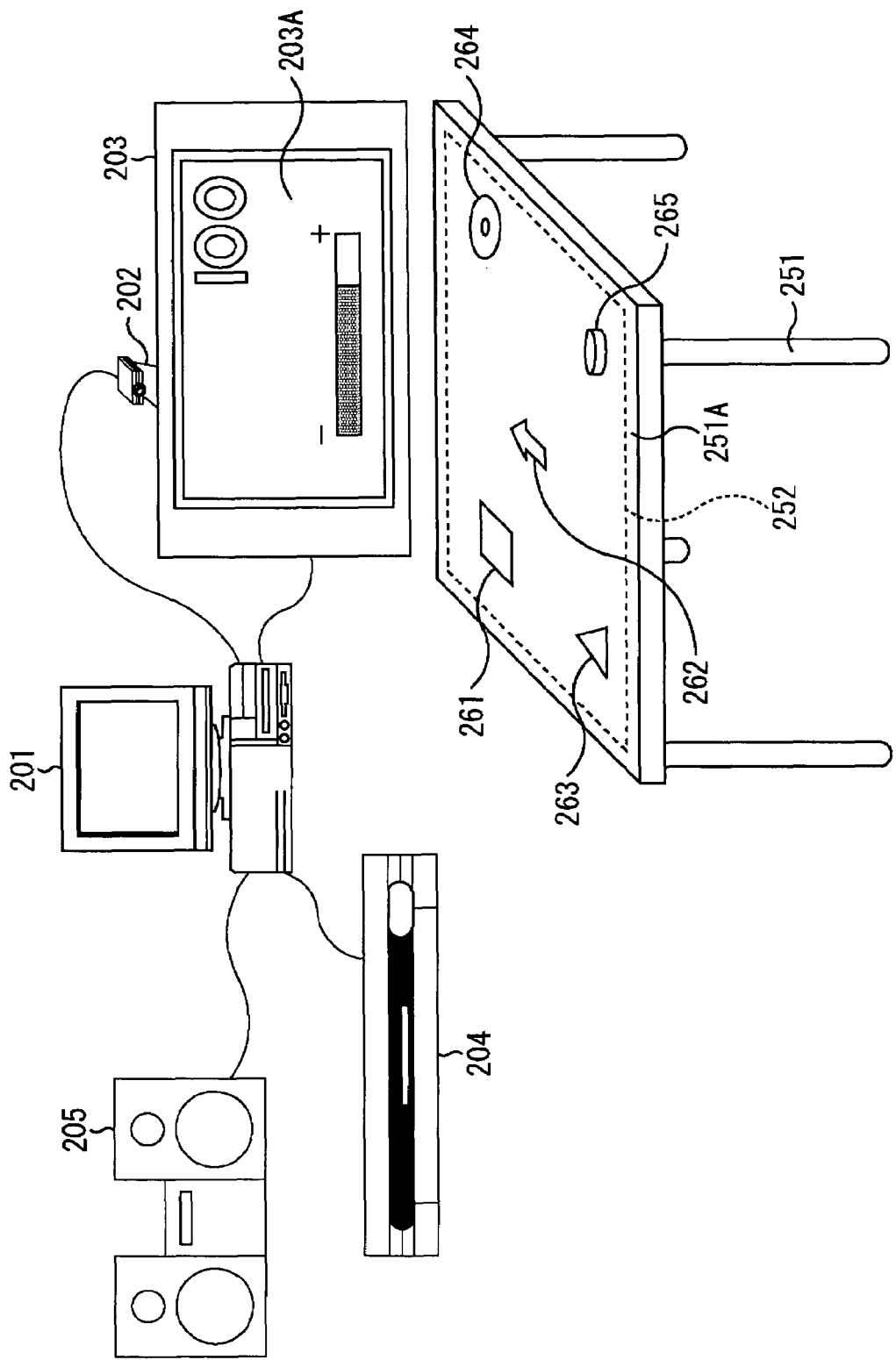
FIG. 26 illustrates another example of the configuration of an information processing system according to an embodiment of the present invention.

FIG. 26 illustrates another example of the configuration of the information processing system discussed with reference to FIG. 23. Instead of the card 213 in FIG. 23, a table 251 serves as the remote controller (user interface). The camera 202 captures an image in a range 252, which is part of or the entirety of a top surface 251A of the table 251, as the photographing range. In the range 252 on the top surface 251A of the table 251, two-dimensional image figures 261 through 264 and a three-dimensional item 265 are disposed. A user (not shown) conceals part of or the entirety of the figures 261 through 264 and the three-dimensional item 265 from the camera 202 to input control information. That is, in this case, the entire range 252 serves as the fixed area, and the figures 261 through 264 and the three-dimensional item 265 serve as the variable area code.

When the user conceals part of or the entirety of the figures 261 through 264 and the three-dimensional item 265, the information processing apparatus 201 specifies the concealed figure or item from the image captured by the camera 202 to specify the command designated by the user on the basis of the figure or the item or the position or the direction thereof.

Any number and any shape of the figures or the three-dimensional item serving as the variable area code may be used, and they may be located at any position in the range 252.

In this manner, the user can use the table 251 on which the figures and the three-dimensional item are printed (drawn) on the top surface 251A as a remote controller for the television receiver 203, the hard disk recorder 204, and the audio component 205. That is, the table 251 serves as a battery-free user interface (remote controller) which can be created and operated inexpensively and that allows a user to input a wider variety of operational instructions easily.

As described above, the information processing apparatus 201 (information processing system) can read the state of the figures 261 through 264 and the three-dimensional item 265 disposed on the table 251 to perform control processing for the AV machine in accordance with the code. It is thus possible to provide a remote controller (user interface) which can be created and operated inexpensively and that allows a user to input a wider variety of operational instructions easily.

The above-described series of processing jobs can be executed by hardware or software. In this case, the information processing apparatus 1 shown in FIG. 3 or the information processing apparatus 201 shown in FIG. 24 may be formed as a personal computer, such as that shown in FIG. 27.

Figure 27:
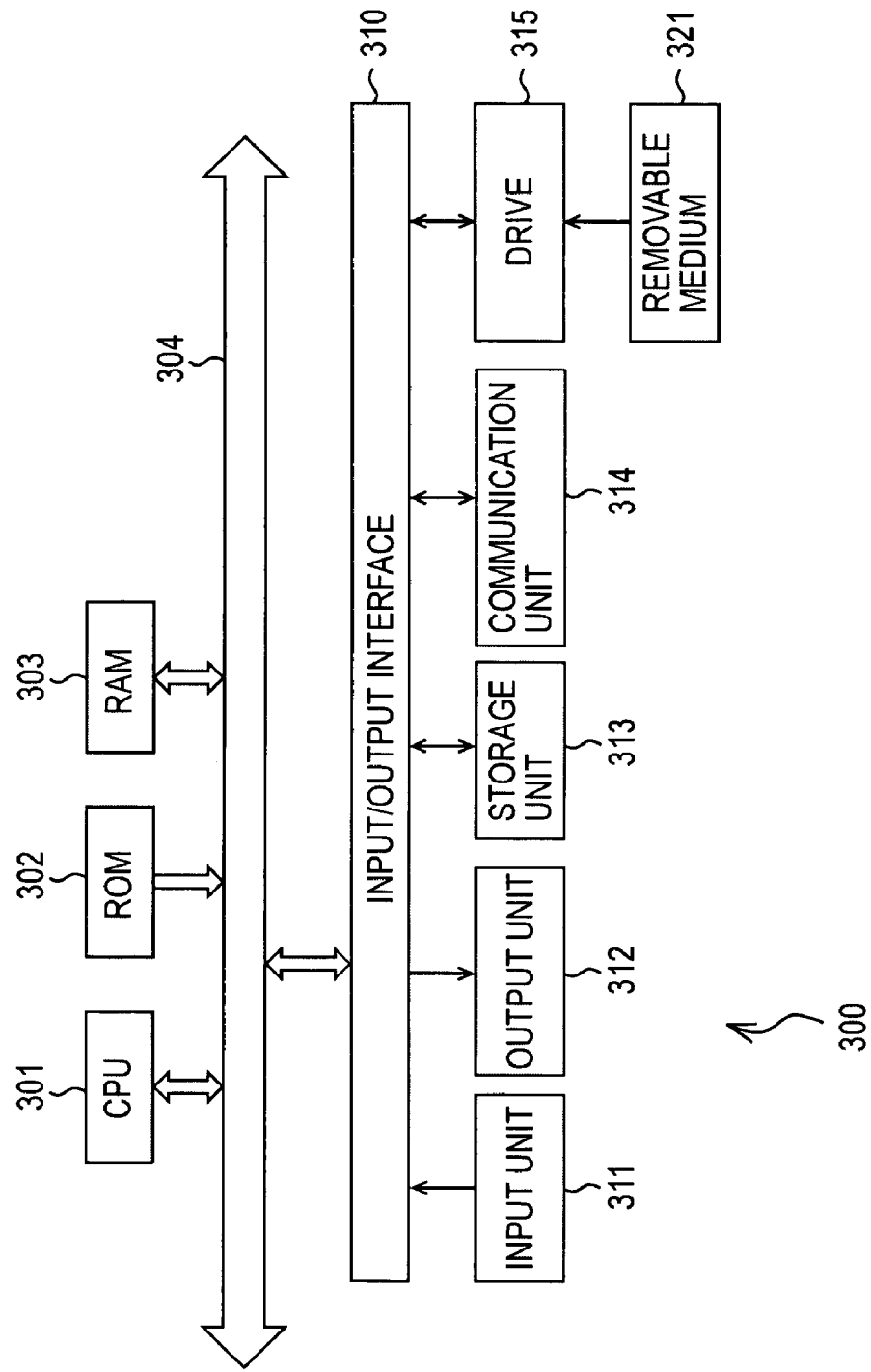
FIG. 27 is a block diagram illustrating an example of the configuration of a personal computer according to an embodiment of the present invention.

In a personal computer 300 shown in FIG. 27, a CPU 301 executes various processing jobs according to a program stored in a ROM 302 or a program loaded into a RAM 303 from a storage unit 313. In the RAM 303, data necessary for the CPU 301 to execute various processing jobs is also stored.

The CPU 301, the ROM 302, and the RAM 303 are connected to each other via a bus 304. An input/output interface 310 is also connected to the bus 304.

An input unit 311 including a keyboard and a mouse, an output unit 312 including a display, such as a cathode ray tube (CRT) or a liquid crystal display (LCD), and a speaker, the storage unit 313 including a hard disk, and a communication unit 314 including a modem are connected to the input/output interface 310. The communication unit 314 performs communication processing via a network including the Internet.

A drive 315 is connected to the input/output interface 310 as necessary, and a removable medium 321, such as a magnetic disk, an optical disc, a magneto-optical disk, or a semiconductor memory, is installed in the drive 315, and a computer program read from the removable medium 321 is installed in the storage unit 313 as necessary.

If software is used for executing the above-described series of processing jobs, a corresponding software program is installed via a network or a recording medium.

The recording medium may be formed of the removable medium 321, such as a magnetic disk (including a flexible disk), an optical disc (including a CD-ROM and a DVD) a magneto-optical disk (including MD (registered)), or a semiconductor memory shown in FIG. 27, which is distributed to the user separately from the computer and having the program thereon. Alternatively, the recording medium may be formed of the ROM 302 having the program thereon or a hard disk contained in the storage unit 313, which is distributed to the user while being integrated in the computer.

In this specification, the steps forming the program recorded in a recording medium may be executed in chronological order described in the specification. Alternatively, they may be executed in parallel or individually.

In this specification, the system represents the entire apparatus including a plurality of devices.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus for reading a code included in an image, comprising:

image data acquisition means for acquiring, via a camera, image data of a control card having a 2D code printed thereon, the 2D code printed on the control card having a first area containing a fixed area in which a predetermined fixed area code is formed, a second area containing a guide portion, and a third area containing a variable area in which a variable area code formed by a combination of a plurality of codes is formed, the plurality of codes created by concealment or unconcealment of cells in the variable area;

fixed area code recognition means for analyzing the acquired image data to recognize the predetermined fixed area code of the fixed area;

variable area code default value setting means for setting a default value of the variable area code based on the predetermined fixed area code;

variable area code recognition means for analyzing the acquired image data to recognize the variable area code;

comparison means for comparing the recognized variable area code with the default value to determine a difference between the variable area code and the default value; and command designation means for designating a command to be executed based on the obtained difference.

2. The information processing apparatus according to claim 1, wherein the value of the entire variable area code formed in the variable area is set to be the default value, and the variable area code is changed by concealing part of or the entirety of the variable area code.

3. The information processing apparatus according to claim 1, wherein a state in which no variable area code is formed in the variable area is set to be the default value, and the variable area code is changed by adding a code to the variable area.

4. The information processing apparatus according to claim 1, further comprising code table storage means for storing a code table, which is table information for associating the fixed area code with the default value, wherein the variable area code default value setting means sets the default value corresponding to the fixed area code by referring to the code table stored in the code table storage means.

5. The information processing apparatus according to claim 1, further comprising command table storage means for storing a command table, which is table information for associating the difference with the command, wherein the command designation means designates the command corresponding to the difference by referring to the command table stored in the command table storage means.

6. The information processing apparatus according to claim 1, wherein the guide portion is a basis for specifying a position of the fixed area and a position of the variable area included in the code.

7. An information processing method for an information processing apparatus for reading a code included in an image, comprising the steps of:

executing, by a processor, the steps of:

acquiring, via a camera, image data of a control card having a 2D code printed thereon, the 2D code printed on the control card having a first area containing a fixed area in which a predetermined fixed area code is formed, a second area containing a guide portion, and a third area containing a variable area in which a variable area code formed by a combination of a plurality of codes is formed, the plurality of codes created by concealment or unconcealment of cells in the variable area;

recognizing the predetermined fixed area code of the fixed area by analyzing the acquired image data;

setting a default value of the variable area code based on the recognized predetermined fixed area code;

recognizing the variable area code by analyzing the acquired image data;

comparing the recognized variable area code with the set default value to determine a difference between the variable area code and the default value; and designating a command to be executed based on the determined difference.

8. A computer-readable storage medium storing a computer-readable program which, when executed by a processor, performs a method of processing for reading a code included in an image, the method comprising the steps of:

acquiring, via a camera, image data of a control card having a 2D code printed thereon, the 2D code printed on the control card having a first area containing a fixed area in which a predetermined fixed area code is formed, a second area containing a guide portion, and a third area containing a variable area in which a variable area code formed by a combination of a plurality of codes is formed, the plurality of codes created by concealment or unconcealment of cells in the variable area;

recognizing the predetermined fixed area code of the fixed area by analyzing the acquired image data;

setting a default value of the variable area code based on the recognized predetermined fixed area code;

recognizing the variable area code by analyzing the acquired image data;

comparing the recognized variable area code with the set default value to determine a difference between the variable area code and the default value; and designating a command to be executed based on the determined difference.

9. An information processing system comprising:

an information processing apparatus for reading a 2D code printed on a control card; and an input device for inputting information into the information processing apparatus according to the 2D code, wherein the information processing apparatus includes image data acquisition means for acquiring, via a camera, image data of the control card having a 2D code printed thereon, the 2D code printed on the control card having a first area containing a fixed area in which a predetermined fixed area code is formed, a second area containing a guide portion, and a third area containing a variable area in which a variable area code formed by a combination of a plurality of codes is formed, the plurality of codes created by concealment or unconcealment of cells in the variable area;

fixed area code recognition means for analyzing the acquired image data to recognize the predetermined fixed area code of the fixed area;

variable area code default value setting means for setting a default value of the variable area code based on the predetermined fixed area code;

variable area code recognition means for analyzing the acquired image data to recognize the variable area code;

comparison means for comparing the recognized variable area code with the default value to determine a difference between the variable area code and the default value; and command designation means for designating a command to be executed based on the obtained difference, and the input device includes operation receiving means for receiving an operation performed on the 2D code by a user and showing the 2D code which is changed by the received operation to an imaging portion of the information processing apparatus, thereby inputting information corresponding to the operation into the information processing apparatus.

10. An information processing apparatus for reading a code included in an image, comprising:

an image data acquisition unit configured to acquire, via a camera, image data of a control card having a 2D code printed thereon, the 2D code printed on the control card having a first area containing a fixed area in which a predetermined fixed area code is formed, a second area containing a guide portion, and a third area containing a variable area in which a variable area code formed by a combination of a plurality of codes is formed, the plurality of codes created by concealment or unconcealment of cells in the variable area;

a fixed area code recognition unit configured to analyze the acquired image data to recognize the predetermined fixed area code of the fixed area;

a variable area code default value setting unit configured to set a default value of the variable area code based on the predetermined fixed area code;

a variable area code recognition unit configured to analyze the acquired image data to recognize the variable area code;

a comparator configured to compare the recognized variable area code with the default value to determine a difference between the variable area code and the default value; and a command designation unit configured to designate a command to be executed based on the obtained difference.

11. An information processing system comprising:

an information processing apparatus for reading a 2D code printed on a control card; and an input device for inputting information into the information processing apparatus according to the 2D code, wherein the information processing apparatus includes an image data acquisition unit configured to acquire, via a camera, image data of a control card having a 2D code printed thereon, the 2D code printed on the control card having a first area containing a fixed area in which a predetermined fixed area code is formed, a second area containing a guide portion, and a third area containing a variable area in which a variable area code formed by a combination of a plurality of codes is formed, the plurality of codes created by concealment or unconcealment of cells in the variable area;

a fixed area code recognition unit configured to analyze the acquired image data to recognize the predetermined fixed area code of the fixed area;

a variable area code default value setting unit configured to set a default value of the variable area code based on the predetermined fixed area code;

a variable area code recognition unit configured to analyze the acquired image data to recognize the variable area code;

a comparator configured to compare the recognized variable area code with the default value to determine a difference between the variable area code and the default value; and a command designation unit configured to designate a command to be executed based on the obtained difference, and the input device includes an operation receiver configured to receive an operation performed on the 2D code by a user and showing the 2D code which is changed by the received operation to an imaging portion of the information processing apparatus, thereby inputting information corresponding to the operation into the information processing apparatus.

* * * * *